United States Patent
Ishihara et al.

(12)
(10) Patent No.: US 6,189,322 B1
(45) Date of Patent: Feb. 20, 2001

(54) REFRIGERANT-CIRCULATING SYSTEM, AND REFRIGERANT COMPRESSOR AND REFRIGERATION CYCLE EMPLOYING THE REFRIGERANT COMPRESSOR

(75) Inventors: Keisaku Ishihara; Yoshinori Shirafuji; Shin Sekiya; Noboru Masuda; Takeshi Izawa; Hideto Nakao; Makoto Tsukiji; Shinsuke Miki, all of Tokyo (JP)

(73) Assignee: Mitsubishi Denki Kabushiki Kaisha, Tokyo (JP)

(*) Notice: Under 35 U.S.C. 154(b), the term of this patent shall be extended for 0 days.

(21) Appl. No.: 09/267,141

(22) Filed: Mar. 11, 1999

(30) Foreign Application Priority Data

Mar. 13, 1998 (JP) .................................... 10-082620
Aug. 31, 1998 (JP) .................................... 10-244682

(51) Int. Cl.[7] ........................................ F25B 41/00
(52) U.S. Cl. ................................... 62/114; 252/67
(58) Field of Search ....................... 62/114, 512; 252/67

(56) References Cited

U.S. PATENT DOCUMENTS 5,557,944 * 9/1996 Hirano et al. ........................ 62/469
5,711,165 * 1/1998 Iizuka et al. ........................ 62/474
5,806,336 * 9/1998 Sunaga et al. ....................... 62/469
5,910,161 * 9/1998 Fujita et al. ........................ 62/211
6,026,649 * 2/2000 Adachi ................................ 62/84

FOREIGN PATENT DOCUMENTS 8-240351  9/1996 (JP).

OTHER PUBLICATIONS

Minoru Takagi, et al., "In a Practical of New Ether Type Lubricants for HCFCs Alternative Refrigerants", The International Symposium on HCFC Alternative Refrigerants '96, Proceedings, Dec. 5–6, 1996, pp. 140–147.

* cited by examiner

Primary Examiner—William Doerrler
Assistant Examiner—Melvin Jones
(74) Attorney, Agent, or Firm—Oblon, Spivak, McClelland, Maier & Neustadt, P.C.

(57) ABSTRACT

A refrigerant-circulating system which comprises a refrigeration cycle comprising a refrigerant compressor, a condenser, an expansion mechanism and an evaporator to form a refrigerant circuit and employing a refrigerant which contains no chlorine, wherein an aromatic polyether oil having as a base oil structure a benzene ring having an ether bond is employed as a refrigerator oil.

19 Claims, 14 Drawing Sheets

CRITICAL SOLUBILITY CURVE
(AROMATIC POLYETHER, POLYOL ESTER)

F I G. 13(a)
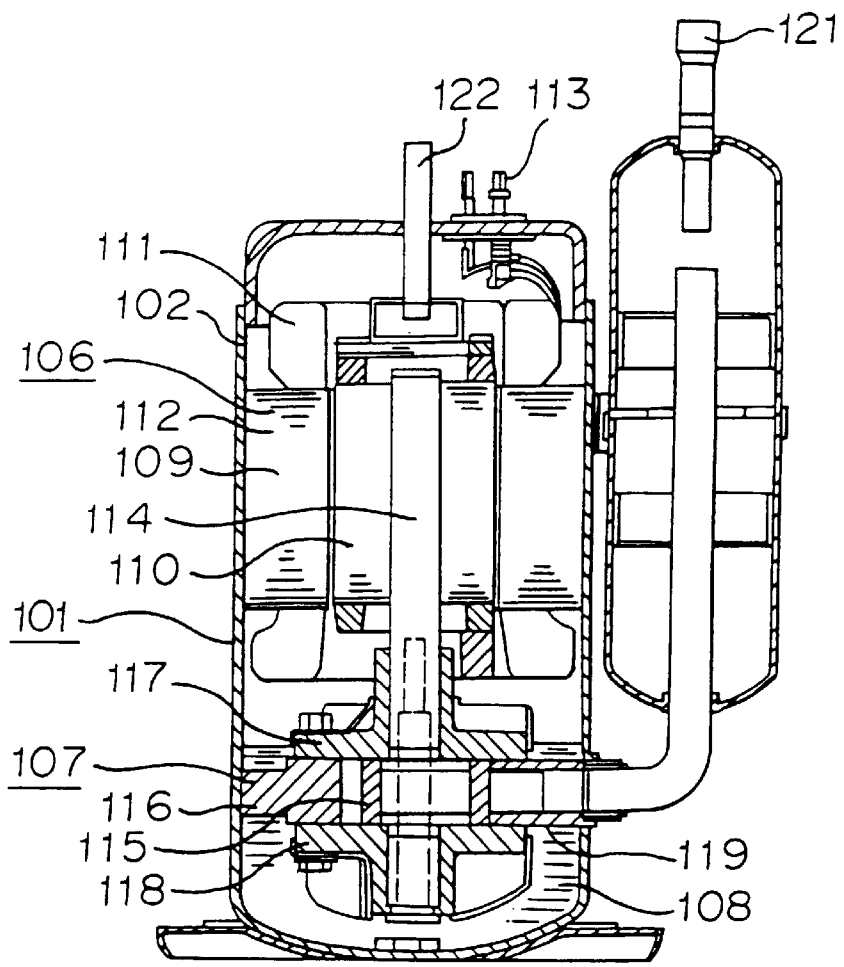
F I G. 13(b)
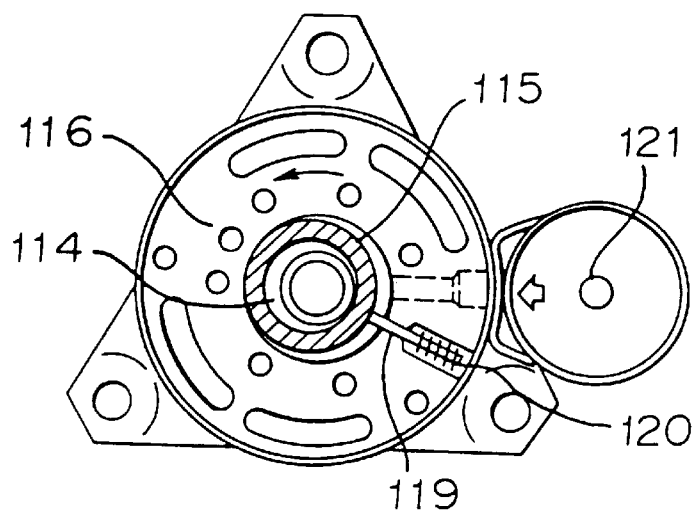

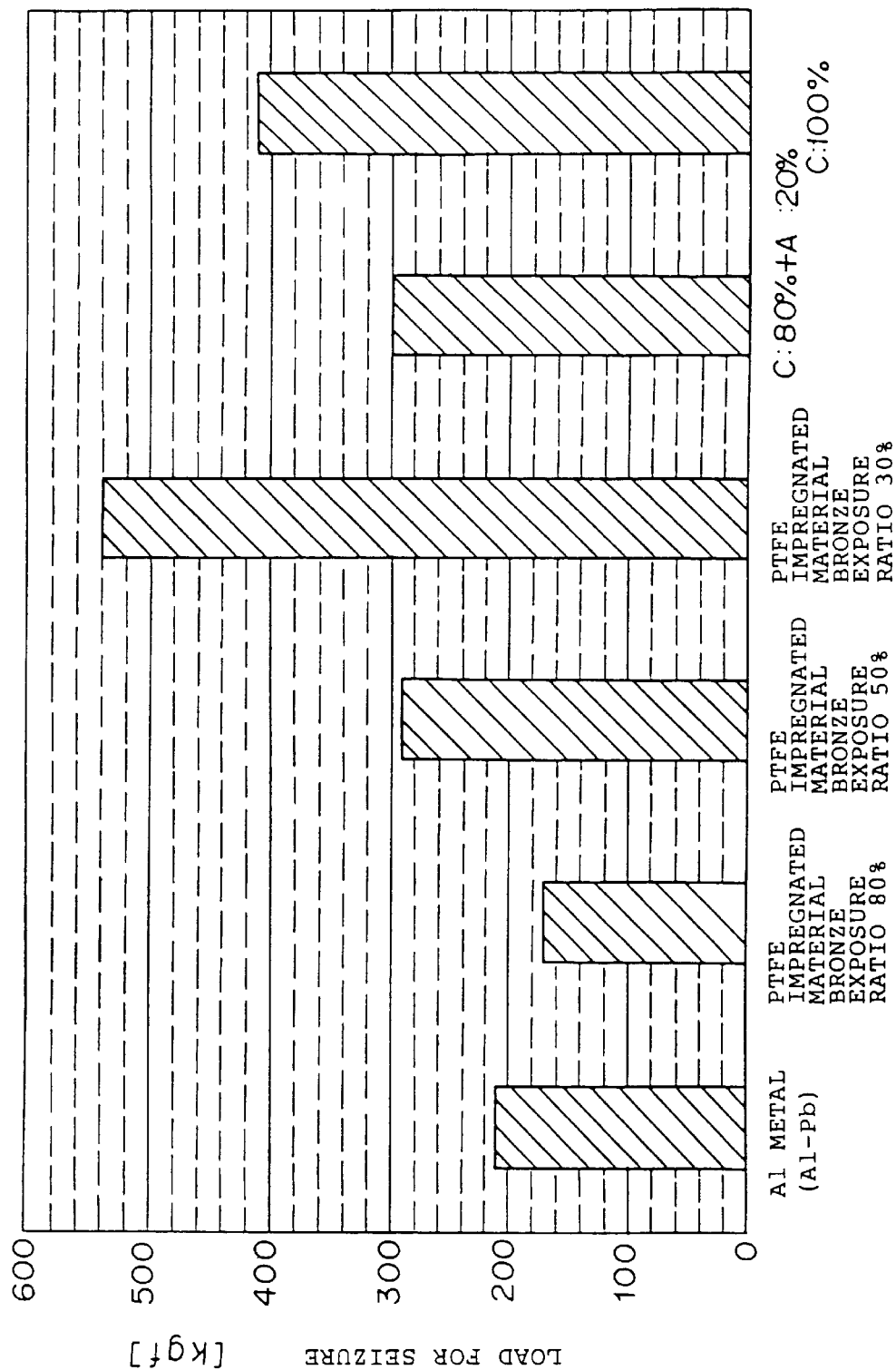

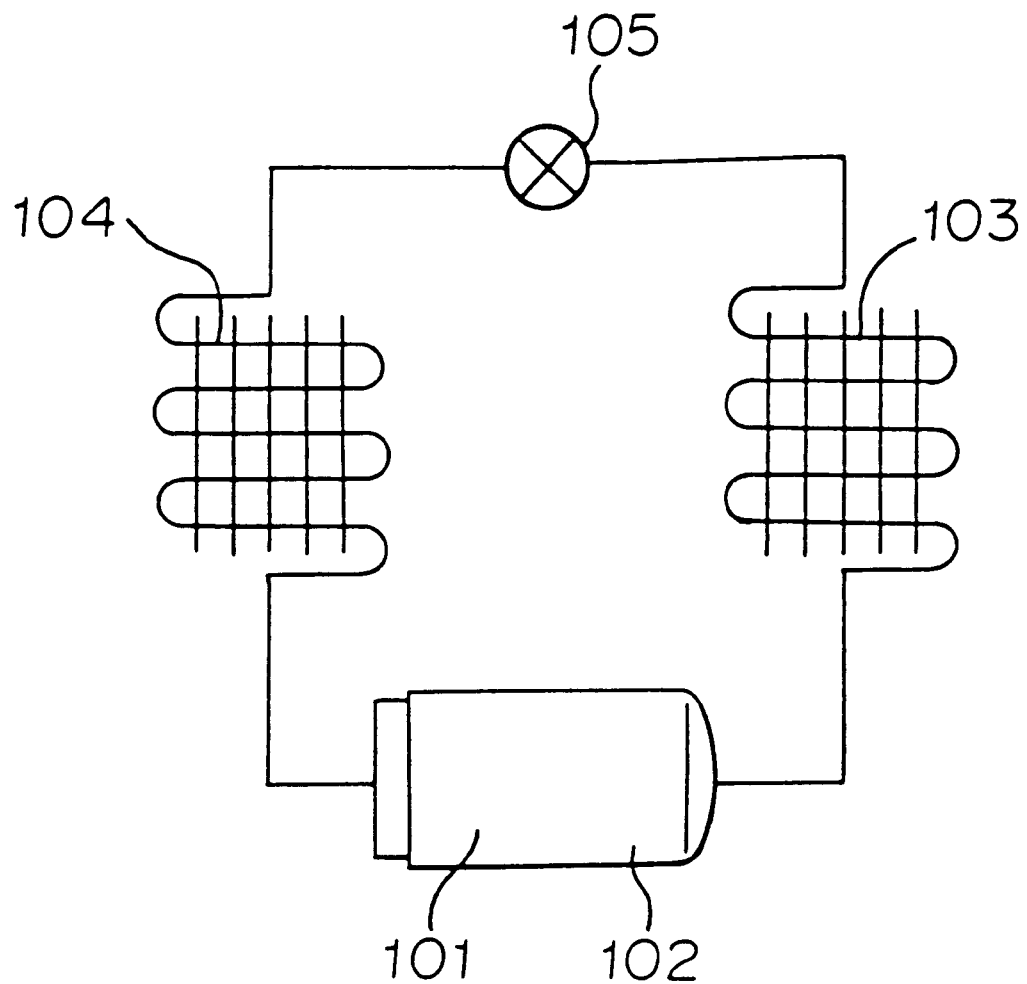

REFRIGERANT-CIRCULATING SYSTEM, AND REFRIGERANT COMPRESSOR AND REFRIGERATION CYCLE EMPLOYING THE REFRIGERANT COMPRESSOR

BACKGROUND OF THE INVENTION

Field of the Invention

The present invention relates to a refrigerant-circulating system, and a refrigerant compressor and a refrigeration cycle such as a freezer or an air-conditioner, employing the refrigerant compressor. More particularly, it relates to a refrigerator oil composition which is suitable to alternative refrigerants a containing no chlorine from the aspect of the protection of the ozone layer and excellent in the compatibility with the refrigerant, the low temperature flowability, thermochemical stability, wear resistance, anti-seizing property and electrical insulation property, and a refrigerant compressor containing said composition, provided with machinery parts, electrical insulating materials or the like excellent in the chemical stability, wear resistance, anti-seizing property and electrical insulation property, and a refrigeration cycle employing this refrigerant compressor.

In recent years, from the viewpoint of protection of ozone layer, it has been regulated to limit the use of freon type refrigerants such as CFC or HCFC containing chlorine which have been employed for refrigerators, freezers, dehumidifiers and air-conditioners.

Under such circumstances, as an alternative refrigerant, hydrofluorocarbon (HFC) and hydrocarbon (HC) which contain no chlorine and have a low reactivity with ozone and a short term for decomposition in air, have been studied and practiced.

However, such alternative refrigerants containing no chlorine in the molecule all have a high polarity and show poor compatibility with conventional refrigerator oils such as a mineral oil or an alkylbenzene oil which have been used for refrigeration cycles of refrigerants containing chlorine Accordingly, developments of new refrigerator oils have been made.

FIG. 15 shows a refrigeration cycle used for conventional alternative refrigerants described in JP-A-8-240351. FIGS. 16(a) and (b) are cross-sectional views of a general refrigerant compressor used for refrigeration cycles suitable for conventional alternative refrigerants. FIG. 16(a) is a vertical cross-sectional view and FIG. 16(b) is a cross-sectional view seen from the upper face of a cylinder.

Here, 101 is a refrigerant compressor, 102 is a closed container, 103 is an evaporator, 104 is a condenser, and 105 is an expansion mechanism such as an expansion valve or a capillary tube. A hydrated fluorocarbon (HFC) containing no chlorine is encapsulated in the circuit to form the refrigeration cycle.

In the closed container 102 of the refrigerant compressor 101, an electrically driving element 106 and a compressing element 107 are contained and a refrigerator oil 180 is stored at the bottom. Further, the electrically driving element 106 comprises a stator 109 and a rotor 110, and the stator 109 comprises a wiring portion 111 and a core portion 112, and electric power is supplied from a hermetically sealed terminal 113 to the electrically driving element 106 through a lead wire. The compressing element 107 is composed of a main shaft 114 connected to the rotor 110, a rolling piston 115 engaged with an eccentric part of the main shaft 114, a cylinder 116 which defines a compression chamber, a main bearing 117 and a sub bearing 118 which close the side faces of the cylinder 116 and at the same time support the main shaft 114, a vane 119 which is slidingly in contact with the outer periphery of the rolling piston 115 and partitions off the compression chamber into a high pressure part and a low pressure part, and a vane spring 120.

The refrigerant compressor 101 is connected to the refrigeration cycle by means of an intake tube 121 and a discharge tube 122.

Now, the operation of conventional refrigeration cycle will be described.

When the compressor is operated, the rotation force of the electrically driving element 106 is transferred to the compressing element 106 by means of the main shaft 114 connected to the rotor 110, whereby the rolling piston 115 engaged with the eccentric portion of the main shaft 114 is eccentrically rotated in the cylinder 116. The vane 119 which partitions off the cylinder 116 into a high pressure part and a low pressure part, is reciprocally moved while the terminal end of the vane 119 is being in contact with the outer periphery of the rolling piston 115 by the back pressure and the spring force of a vane spring 120.

The refrigerant is introduced into the cylinder 116 through the intake tube 112, and compressed by the eccentric rotation of the rolling piston 115 and discharged to the inside of the closed container 102 from the cylinder 116, and then used to cool the electrically driving element 106 and introduced to the external refrigeration cycle through the discharge tube 122.

The overheated refrigerant gas of a high pressure and a high temperature discharged from the refrigerant compressor 101, undergoes heat exchange with the external air by means of the condenser 104 to remove the latent heat, whereby it becomes a refrigerant liquid of a high pressure and a high temperature. Then, the refrigerant becomes a saturated refrigerant liquid of a low pressure by the pressure reduction by means of the expansion mechanism 105, and further undergoes heat exchange with the external air by means of the evaporator 103 to let the latent heat absorbed, whereby it becomes a refrigerant gas.

Here, the refrigerator oil 180 stored at the bottom of the closed container 102 of the refrigerant compressor 101, is supplied from the lower end of the main shaft 114, and used for lubrication of respective sliding parts of the compressing element 107, and then major part thereof is returned to the bottom of the closed container 102, but a part thereof is discharged to the external portion of the refrigerant compressor 101 through the discharge tube 122 along with the refrigerant gas and circulated in the refrigeration cycle, and returned to the refrigerant compressor 101 through the intake tube 121 again.

Accordingly, the refrigerator oil used for the refrigeration cycle is firstly demanded to have a high compatibility with the refrigerant within a wide temperature range of from a low temperature to a high temperature and be excellent in the low temperature flowability, since it is circulated along with the refrigerant.

Further, with conventional refrigerants containing chlorine such as chlorofluorocarbon (CFC) or hydrochlorofluorocarbon (HCFC), the chlorine molecules function as an extreme-pressure additive on the surface of sliding parts and show extremely good lubricating properties. Whereas, with alternative refrigerants containing no chlorine which do not destroy the ozone layer, such extreme-pressure effect of the refrigerants themselves can not be expected, whereby refrigerator oils used for such alternative refrigerants are required to have excellent wear resistance, anti-seizing property, thermal stability and chemical stability in order to lubricate the sliding parts at a high temperature and a high pressure.

Further, since the refrigerator oil is used for the electrically driving element 106 in the closed container 102, whereby it is demanded to have excellent insulating properties as well.

JP-A-1-259093 discloses as a refrigerator oil suitable to a halogenated fluorocarbon (HFC) refrigerant, ones containing propylene glycol monoether (PAG) represented by the following formula (2), as a base oil.

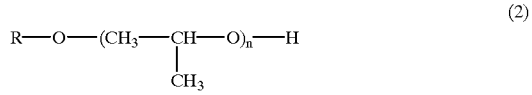

(2)

wherein R is an alkyl group.

Further, JP-A-1-259094 discloses a diether type compound formed by etherifying the terminal end of propylene glycol. However, it is generally known that the PAG oil is poor in the electrical insulating properties, moisture absorptivity, wear resistance and anti-seizing property, and can not be practically used for a closed type refrigerant compressor.

JP-A-8-240351 discloses a refrigerator oil suitable for a hydrogenated fluorocarbon (HFC) refrigerant, containing as a base oil, an ester oil of aliphatic acid having at least two ester bonds (—O—CO—) in the molecule, as indicated by the following formulas, for example, a hindered type ester or a complex type ester of a branched structure having a polyhydric alcohol and a $C_{6-8}$ aliphatic acid.

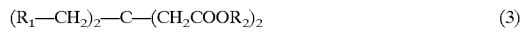 (3)

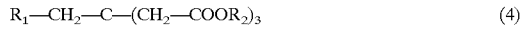 (4)

 (5)

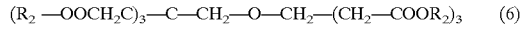 (6)

where $R_1$ is H or a $C_{1-3}$ alkyl group, and $R_2$ is a $C_{5-12}$ alkyl group and may be a mixture of various types of alkyl groups having different carbon numbers.

Further, JP-A-8-151590 discloses a refrigerator oil composition comprising a polyol ester as a base oil, and based on the base oil, from 7.0 to 15.0 wt % of a phosphate and from 0.2 to 3.0 wt % of 1,2-epoxyalkane and/or vinylcyclohexene dioxide.

These ester oils are now most widely studied as refrigerator oils suitable for alternative refrigerants by virtue of their excellent electrical insulation properties and moisture absorptivity.

Further, studies are being made on a polyvinyl ether oil of the following formula. (Reference can be made to the following document.)

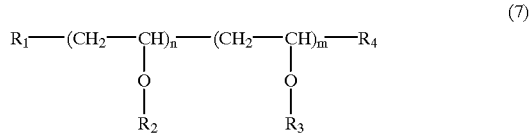 (7)

wherein $R_1$, $R_2$, $R_3$ and $R_4$ are alkyl groups having different carbon numbers, and each of n and m is an integer of at least 1.

("Performance of a new ether oil for HCFCs alternative refrigerants on practical use" by Minoru Takagi, "The International Symposium On HCFC Alternative Refrigerants '96, page 141, Proceedings Dec. 5–6, 1996, International Conference Center Kobe, The Japan Refrigeration and Air Conditioning Industry Association")

As described above, studies have heretofore been made on oxygen-containing hydrocarbon type synthetic oils such as ester type synthetic oils and polyvinyl ether type synthetic oils.

With respect to the ester type synthetic oils, studies have been most widely made by virtue of their superior properties to the polyether type synthetic oils, for example, excellent lubrication property, excellent electrical insulation property and low moisture absorptivity.

However, the ester oil is a synthetic oil formed by dehydration condensation reaction of an aliphatic acid and an alcohol and this reaction is reversible, whereby it tends to undergo hydrolysis in the presence of water. Further, it is known that when an acid is liberated by hydrolysis, corrosion and wearing will be caused.

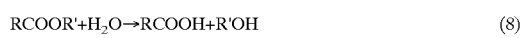 (8)

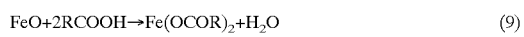 (9)

Since the reaction with metals is accelerated if a fresh face is formed by wearing, hydrolysis tends to be accelerated in the rotary type compressor in which the inside of the closed container 102 is maintained at a high temperature and a high pressure and which has sliding parts where fluid lubrication is hardly performed such as the terminal end of the vane 119 and the periphery of the rolling piston 115.

The wearing by hydrolysis or the deterioration of the refrigerator oil tends to cause problems that sludges are deposited in the expansion mechanism 105 such as capillary tubes or expansion valves in the refrigeration cycle and clogging of the expansion mechanism 105 is thereby caused, leading to failure in cooling or ordinary operation.

To cope with such problems, studies have been made on the base oil structure having a branched chain taking the hydrolysis into consideration and the additives such as epoxy in order to capture and neutralize the free aliphatic acid after hydrolysis, and on the types or amounts of extreme-pressure additives in order to reduce the wearing which accelerates the hydrolysis. However, the hydrolysis is necessarily unavoidable since the ester structure is possessed in the molecule.

Further, in the case of air-conditioner, since an exterior device and an interior device are connected at the time of installation work, water content may be incorporated into the refrigeration cycle in the installation work, and it is impossible to control strictly the water content only in the factory. Accordingly, by using the ester oil as the refrigerator oil, clogging of the expansion mechanism 105 and failure in cooling may be caused.

On the other hand, with respect to the ether oil, although the hydrolysis which is the drawback of the ester oil is not caused, the ether bond is likely to cause problems that deterioration by oxidation is likely caused, the lubricity is inferior, and wearing or scuffing are likely caused at the terminal end of the vane 119, the outer periphery of the rolling piston 115 or the like on which severe sliding conditions are demanded.

Further, there is a drawback that the ether oil is poor in the insulation property necessary for the refrigerator oil for the refrigerant compressor.

It is an object of the present invention to provide a highly reliable refrigerant-circulating system employing a new refrigerator oil which solves the problems of the refrigerator oils used for the refrigerant-circulating systems for conventionally studied alternative refrigerants, by analysis and researches on practical use conditions in the production steps of the practical manufacturing sites, the installation work and the market of the refrigerant-circulating systems and the refrigerant compressors, in order to solve the above-mentioned problems.

It is another object of the present invention to define an optimum viscosity range for the viscosity grade of the refrigerator oil, which decisively affects the reliability and energy efficiency of the refrigerant-circulating system and compressor, under the operational conditions of the refrigerant-circulating system and the refrigerant compressor in general purpose operations such as freezing, refrigeration, air-conditioning and dehumidification.

It is an object of the present invention to provide improvements by use of additives for a new refrigerator oil and methods for improving insulation properties and the constitution of the refrigerant-circulating system, by which highly reliable refrigerant-circulating systems can be provided even in the case where a high pressure type rotary type compressor is used in a refrigerant compressor used for severe environment for the use of the refrigerator oil, or in the case where long existent pipelines containing a large amount of contamination is used.

It is an object of the present invention to provide a highly reliable method useful for the case where a retrofitting operation wherein a refrigerant containing chlorine used for an existent refrigerant-circulating system is changed to a refrigerant containing no chlorine, is conducted.

It is another object of the present invention to provide a highly reliable refrigerant compressor having a high performance, which contains a refrigerator oil having an excellent compatibility with a refrigerant containing no chlorine and excellent lubricity, chemical stability and the like.

It is an object of the present invention to provide a refrigerant compressor provided with machinery parts such as a bearing, a spring and a seal material which are excellent in e.g. chemical stability, wear resistance and anti-seizing property, suitable for such combination of the refrigerant and the refrigerator oil.

It is an object of the present invention to provide a refrigerant compressor provided with a hermetically sealed terminal, a wiring for a stator and a core portion of a stator which are excellent in e.g. chemical stability and electrical insulation property, suitable for such combination of the refrigerant and the refrigerator oil.

It is an object of the present invention to provide a highly reliable refrigeration cycle employing the refrigerant containing no chlorine and the above-mentioned refrigerant compressor.

SUMMARY OF THE INVENTION

According to the first aspect of the present invention, there is provided a refrigerant-circulating system which comprises a refrigeration cycle comprising a refrigerant compressor, a condenser, an expansion mechanism and an evaporator to form a refrigerant circuit and employing a refrigerant which contains no chlorine, wherein an aromatic polyether oil having as a base oil structure a benzene ring having an ether bond is employed as a refrigerator oil, in order to solve the above-mentioned problems.

According to the second aspect of the present invention, the base oil structure of the aromatic polyether oil is represented by the following formula (1):

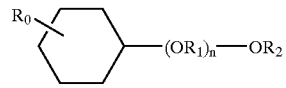 (1)

wherein

is a benzene ring, each of $R_0$, $R_1$ and $R_2$ is an alkyl group having a carbon number of from 0 to 7, the number of $R_0$ is from 1 to 3 and $R_0$ may be attached to any one of five sites of the benzene ring; O is an oxygen atom, and n is a polymerization degree and is an integer of from 1 to 48.

According to the third aspect of the present invention, in the refrigeration cycle of the above first aspect, the refrigerator oil is a mixture of the aromatic polyether oil and at least one hydrocarbon oil selected from an alkylbenzene, a paraffin type mineral oil, a naphthene type mineral oil and the like.

According to the fourth aspect of the present invention, the refrigerator oil has a viscosity of from 5 to 50 cSt at 40° C. and is used for freezing or refrigeration in which the refrigeration cycle has an evaporation temperature range of from −45 to 0° C.

According to the fifth aspect of the present invention, the refrigerator oil has a viscosity of from 20 to 80 cSt at 40° C. and is used for air conditioning or dehumidification in which the refrigeration cycle has an evaporation temperature range of from −20 to 20° C.

According to the sixth aspect of the present invention, the refrigerant is a single refrigerant or a refrigerant mixture of a hydrofluorocarbon (HFC) containing no chlorine having a critical temperature of at least 40° C. and contains at least one selected from the group consisting of R134a, R32 and R125.

According to the seventh aspect of the present invention, the refrigerant is a fluorine-containing hetero compound which has a critical temperature of at least 40° C. and contains no chlorine, and is selected from a fluorine-containing alcohol, a fluorine-containing ether, an fluorine-containing amine, a fluorine-containing alkoxysilane and the like.

According to the eighth aspect of the present invention, a drying agent is disposed in the refrigerant circuit for removal of water.

According to the ninth aspect of the present invention, the refrigerator oil contains at least one selected from the group consisting of an extreme-pressure additive, an oiliness improver, an antioxidant, an acid remover, a defoaming agent and a metal deactivator.

According to the tenth aspect of the present invention, a drying agent is disposed in the refrigerant circuit for removal of water and the drying agent contains no activated alumina as a main component.

According to the eleventh aspect of the present invention, there is provided a method for retrofitting a refrigerant-circulating system which comprises a refrigerant cycle comprising a refrigerant compressor, a condenser, an expansion mechanism and an evaporator to form a refrigerant circuit, and employs a refrigerant containing chlorine contained in the system, such as chlorofluorocarbon (CFC) or hydrochlorofluorocarbon (HCFC), and a refrigerator oil contained in the refrigerant compressor, characterized in that the refrigerant containing chlorine is discharged from the refrigerant-circulating system; a refrigerant containing no chlorine, such as hydrofluorocarbon (HFC) or a fluorine-containing hetero compound, is charged thereinto; and the refrigerator oil contained in the refrigerant compressor is replaced with an aromatic polyether oil having as a base oil structure a benzene ring having an ether bond or its oil mixture.

According to the twelfth aspect of the present invention, there is provided a refrigerant compressor employing a refrigerant containing no chlorine, which comprises an electrically driving element and a compressing element which compresses the refrigerant by rotating a main shaft by means of the electrically driving element, wherein an aromatic polyether oil having as a base oil structure a benzene ring having an ether bond is employed as a refrigerator oil.

According to the thirteenth aspect of the present invention, there is provided an impregnated bronze material or a carbon material is used as a bearing material of a bearing portion which supports the main shaft in the refrigerant compressor of the twelfth aspect.

According to the fourteenth aspect of the present invention, there is provided a spring made of a SUS material or a spring subjected to corrosion resistant surface treatment is used.

According to the fifteenth aspect of the present invention, a hermetically sealed terminal which is covered and sealed with at least one resin excellent in electrical insulation property and corrosion resistance, selected from the group consisting of polyethylene terephthalate, polyphenylene sulfide, polybutylene terephthalate, a nylon resin, polyethylene naphthalate, a polyimide resin, a polyamideimide resin, polyethersulfone, polyetherether ketone, polysulfone, a fluorine resin and silicone, is disposed.

According to the sixteenth aspect of the present invention, a non-polar rubber such as natural rubber, styrene-butadiene rubber, butadiene rubber, ethylenepropylenediene monomer or butyl rubber, or a hydrogenated nitrile rubber is used as a sealing material.

According to the seventeenth aspect of the present invention, at least one selected from the group consisting of polyester/polyamide, polyesterimide, polyester/polyamideimide, polyesterimide/polyamideimide, polyamideimide and polyimide, is used as an insulating coating material for a winding of a stator of the electrically driving element.

According to the eighteenth aspect of the present invention, at least one selected from the group consisting of polyethylene terephthalate, polybutylene terephthalate, polyphenylene sulfide, polyethylene naphthalate, a fluorine resin, polyamideimide and polyimide, is disposed at the inner wall of a winding hole of a core portion of a stator of the electrically driving element, as an electrical insulating film material for electrical insulation from a winding.

According to the nineteenth aspect of the present invention, there is provided a refrigeration cycle which comprises a refrigerant compressor, a condenser, an expansion mechanism and an evaporator, wherein at least one selected from the group consisting of carbon dioxide, ammonia, hydrofluorocarbon and a fluorine-containing hetero compound, is employed as a refrigerant, and the refrigerant compressor as defined in the twelfth aspect is used.

BRIEF DESCRIPTION OF THE DRAWINGS

FIG. 13 is a cross-sectional view of a refrigerant compressor (rotary type) used for the refrigeration cycle according to Embodiment 7.

FIG. 14 is a view showing the seizing properties of a bearing with respect to the refrigerator oil and the refrigerant of the present invention.

FIG. 15 is a view showing a conventional refrigeration cycle.

DESCRIPTION OF THE PREFERRED EMBODIMENTS

Hereinafter, the present invention will be described in further detail.

Embodiment 1

Figure 1:
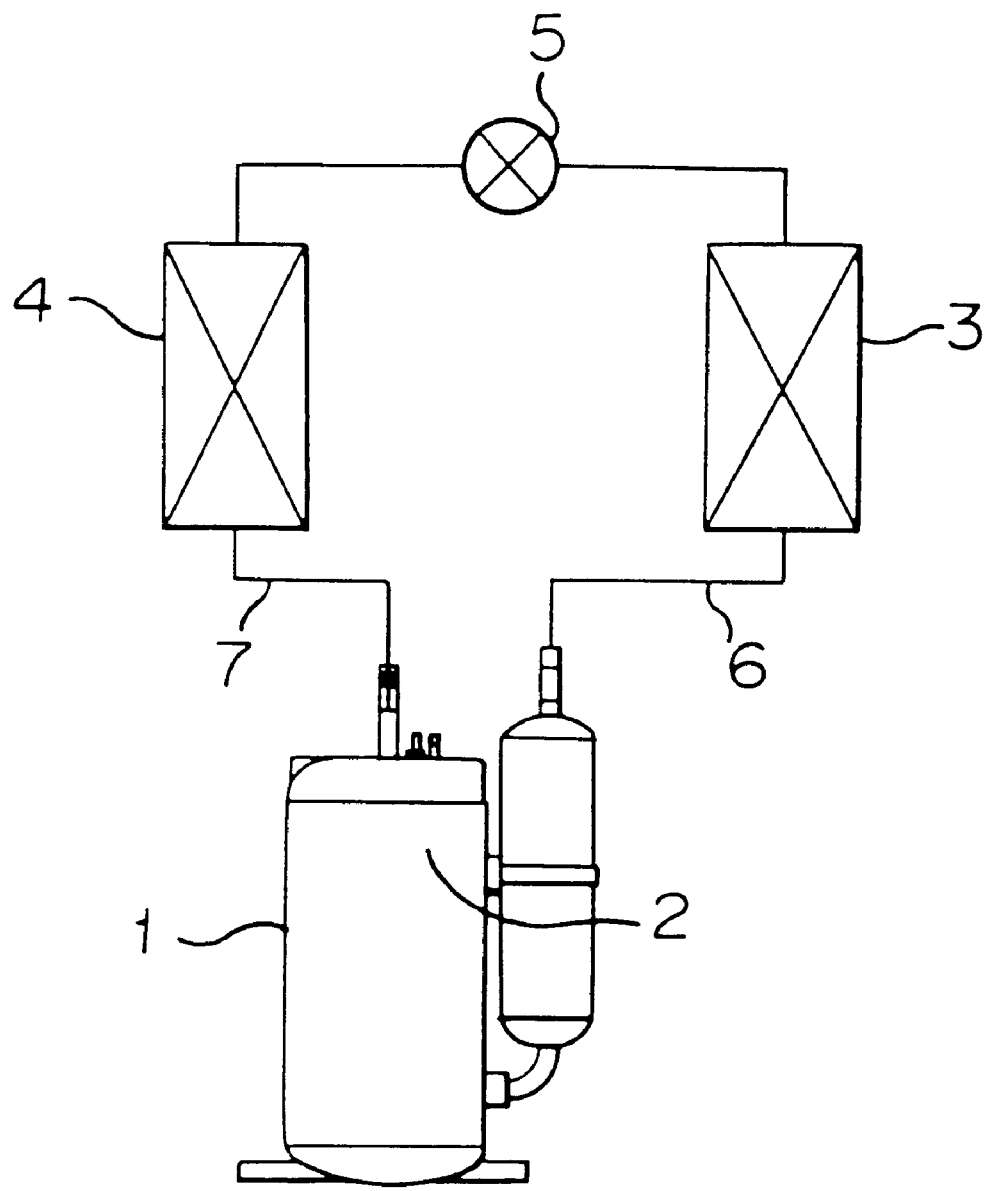
FIG. 1 is a view showing a circuit structure of a refrigerant-circulating system in accordance with Embodiment 1 of the present invention.
Figure 2:
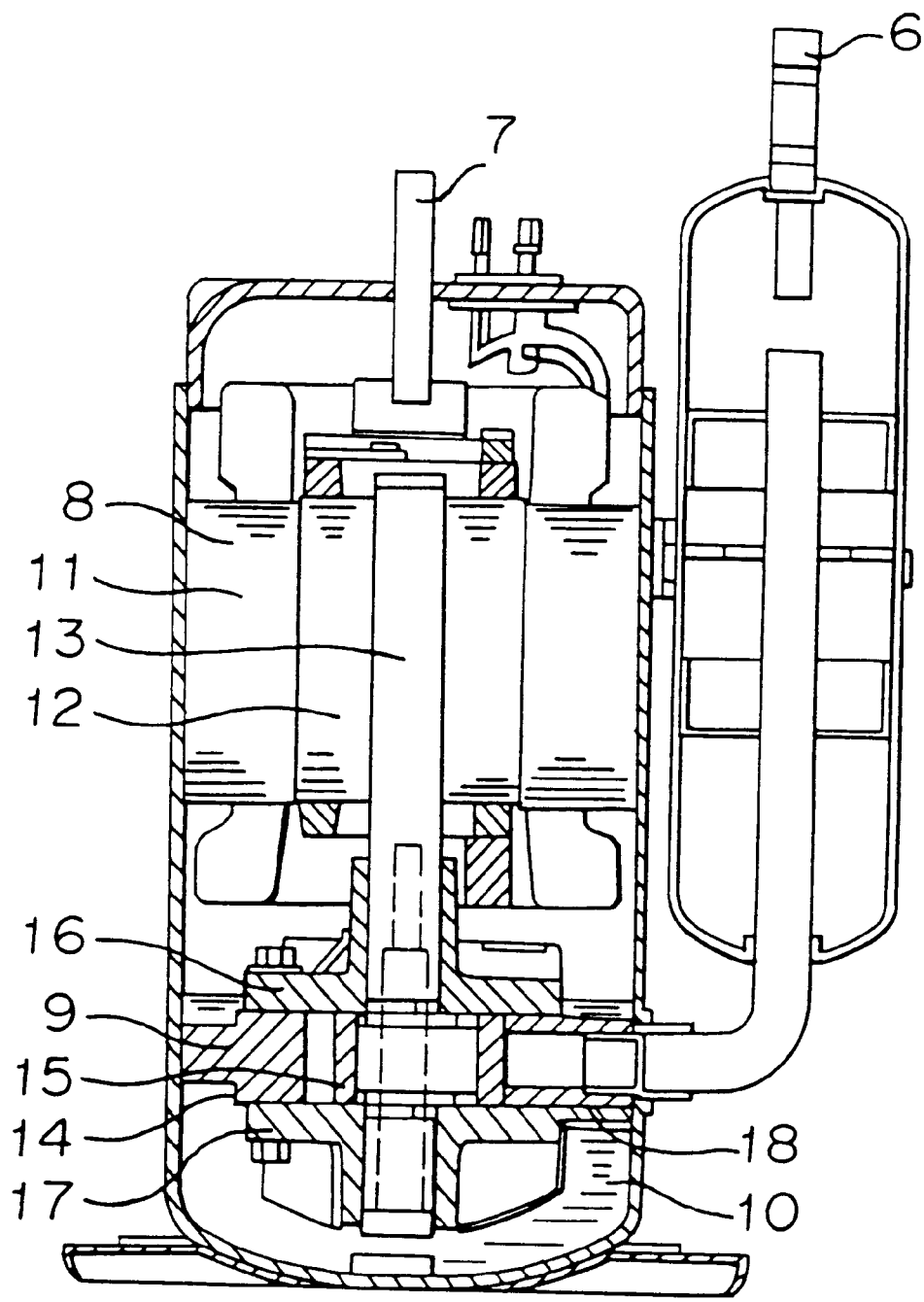
FIG. 2 is a vertical cross-sectional view of a refrigerant compressor used for the refrigerant-circulating system according to Embodiment 1.

FIG. 1 is a view showing the structure of the refrigerant-circulating system according to the present invention, and FIG. 2 is a vertical cross-sectional view of a so-called rotary type refrigerant compressor used for the refrigerant-circulating system of the present invention. In these Figures, 1 is a refrigerant compressor, 2 is a closed container, 3 is an evaporator, 4 is a condenser, 5 is an expansion mechanism, 6 is an intake tube, 7 is a discharge tube, 8 is an electrically driving element, 9 is a compressing element, 10 is a refrigerator oil, 11 is a stator of a motor, 12 is a rotor of a motor, 13 is a main shaft, 14 is a rolling piston, 15 is a cylinder, 16 is a receiver of the main shaft, 17 is a sub bearing and 18 is a vane.

The refrigerator oil 10 is stored at the bottom of the closed container 2 of the refrigerant compressor 1. Here, as the refrigerator oil 10, an aromatic polyether of the following formula (1) having a benzene ring having an ether bond as the base oil structure, is employed.

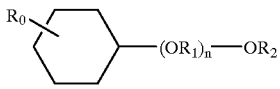

wherein

is a benzene ring, each of $R_0$, $R_1$ and $R_2$ is an alkyl group having a carbon number of from 0 to 7, the number of $R_0$ is from 1 to 3 and $R_0$ may be attached to any one of five sites of the benzene ring; O is an oxygen atom, and n is a polymerization degree and is an integer of from 1 to 48.

More specifically, the one having the following base oil structure (10) is practically used.

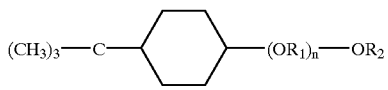

(10)

where $R_1$ is at least one of —$CH_2$—$CH_2$—,

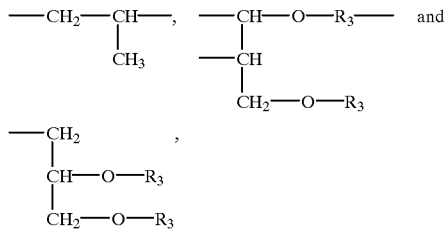

$R_2$ is at least one of —$CH_3$ and —H, $R_3$ is $R_1$ or $R_2$, O is an oxygen atom and n is a polymerization degree which depends on the viscosity and may be from 2 to 24.

This refrigerant is a hydrofluorocarbon (HFC) which contains no chlorine molecules and has a critical temperature of at least 40° C. When used for air-conditioning, as the refrigerant, R410A which is a pseudo-azeotropic mixture refrigerant containing R32 and R125 each in an amount of 50%, or R407C or R407E which is a non-azeotropic mixture refrigerant of R134a, R32 and R125, is charged. When used for freezing or refrigeration, a single refrigerant of R134a, R404A which is a pseudo-azeotropic mixture refrigerant of R125, R134a and R143, or the like is charged.

Figure 3:
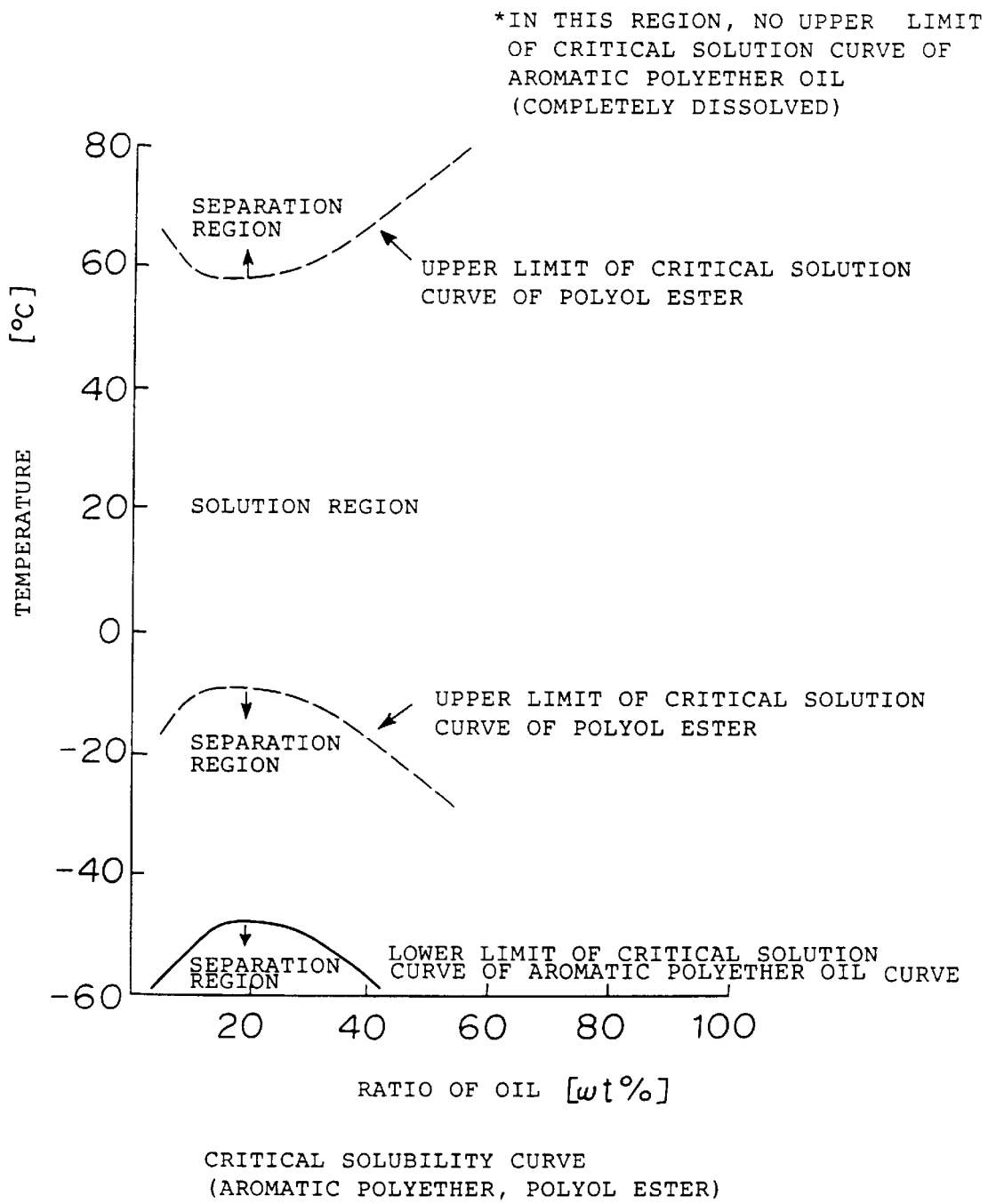
FIG. 3 is a characteristic view showing the critical solubility of a refrigerator oil used for the refrigerant-circulating system according to Embodiment 1.

Here, since the aromatic polyether oil having the above base oil structure is used as the refrigerator oil 10, the compatibility with these hydrofluorocarbon (HFC) type refrigerants having a high polarity is good by virtue of the ether bond, and even if the refrigerator oil 10 flows out of the closed container 2 of the refrigerant compressor 1 along with the discharged refrigerant, it will be dissolved in the refrigerant and can be returned to the closed container 2 via the refrigeration cycle. FIG. 3 shows critical solubility curves of the aromatic polyether oil and conventional polyol ester oil with hydrofluorocarbon (HFC) refrigerant for comparison. It is clearly understood that the aromatic polyether oil is dissolved in the HFC refrigerant within an extremely wide temperature range as compared with the polyol ester oil.

Further, since the aromatic polyether oil has a structure having an ether bond and containing no ester group in the molecule as indicated in the above formula (10), it does not undergo hydrolysis in the presence of the water content unlike the ester oil. Accordingly, the aromatic polyether oil is unlikely to cause dangers such that deterioration is accelerated at the frictional surface and the reaction with metals forms metallic soaps, whereby clogging of the expansion mechanism 5 is formed in the refrigerant-circulating system. By such advantage, with respect to products like an air-conditioner wherein the exterior device and the interior device are connected by installation work, even if in the worst case on the market wherein a large amount of water is incorporated, for example, the work in the rain or the work utilizing conventional existent pipelines, it is possible to provide an extremely highly reliable refrigerant-circulating system.

Embodiment 1 shows a case using the refrigerant-circulating system having each one of the condenser, evaporator and expansion mechanism in the system. However, the system may be a refrigerant-circulating system having plural numbers of the condensers, evaporators and expansion mechanisms like a multi-type air-conditioner which is being increased in recent years and has a plurality of internal devices to one external device. In such a case, since the length of the pipelines of the entire refrigerant-circulating system is long, the refrigerator oil of the present invention is more advantageous in the flowability and oil recovery by virtue or its good compatibility with the refrigerant. Further, since the amount of contamination such as water content incorporated therein is relatively large, the refrigerator oil of the present invention shows considerably low possibility of deterioration relative to the ester oil.

The above description is given with respect to the case of a high-pressure container rotary as the closed type compressor. However, the same effects can be given with respect to the cases of a low-pressure container-type recipro compressor or scroll compressor.

Then, the selection of viscosity grade of the refrigerator oil 10 is important to the lubricity of the refrigerant compressor 1, the flowability and oil recovery property of the refrigerator oil 10 which flows out of the refrigerant compressor 1. More specifically, it is required to select optimum viscosity grade taking into consideration the viscosity index and solubility properties determined by the base oil structure of the refrigerator oil 10, the type of the refrigerant compressor 1, the pressure and temperature inside the closed container 2, and the operational temperature conditions of the refrigerant-circulating system. Namely, the refrigerator oil is required to have a suitable viscosity such that a viscosity necessary for sliding parts can be maintained and extraordinary wearing or seizure is not caused under such a state that the refrigerant is solved at the pressure and temperature range within the closed container 2 of the refrigerant compressor 1, and at the same time, extraordinary sliding loss due to the viscosity and the reduction of efficiency of the system would not be caused. Then, the refrigerator oil is required to have a viscosity such that when the refrigerator oil 10 flows out of the refrigerant compressor 1, the refrigerant and the refrigerator oil 10 in a solved state can flow at the refrigerant-flowing rate determined by the operation conditions at the low-temperature portion of the refrigerant-circulating system, and the refrigerator oil can be turned to the inside of the refrigerant compressor 1 so that no shortness of the lubricant of the refrigerant compressor 1 is caused.

Figure 4:
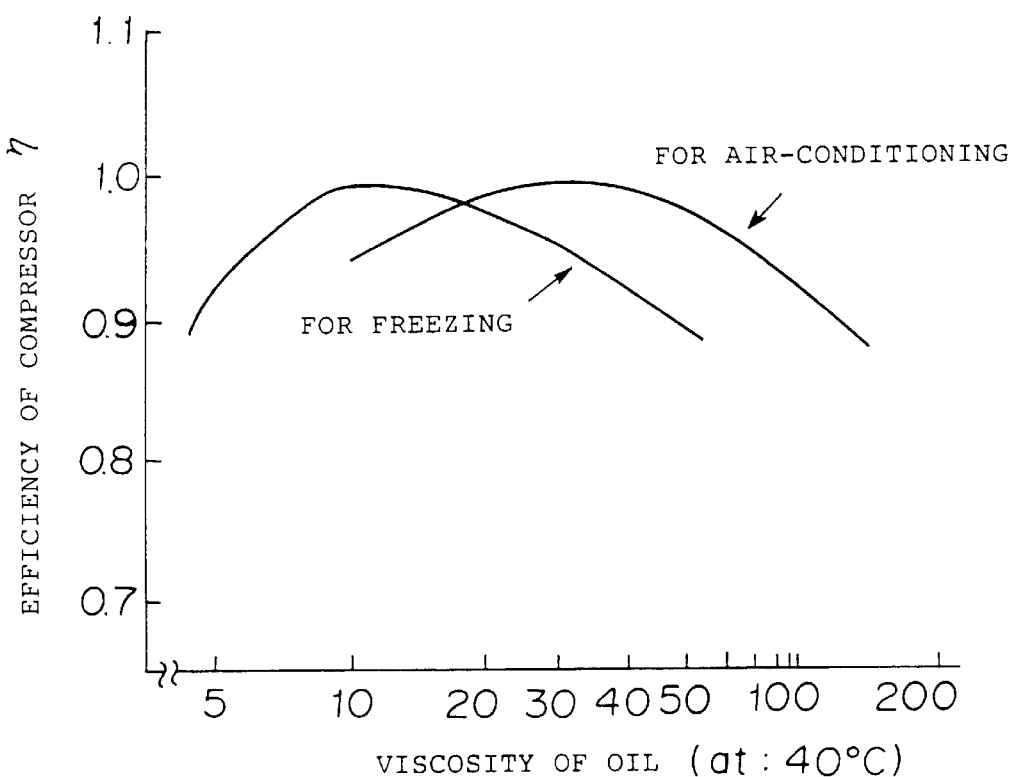
FIG. 4 is a characteristic view showing the efficiencies of the compressors depending on the viscosity grades of the refrigerants used for the refrigerant-circulating system according to Embodiment 1.
Figure 5:
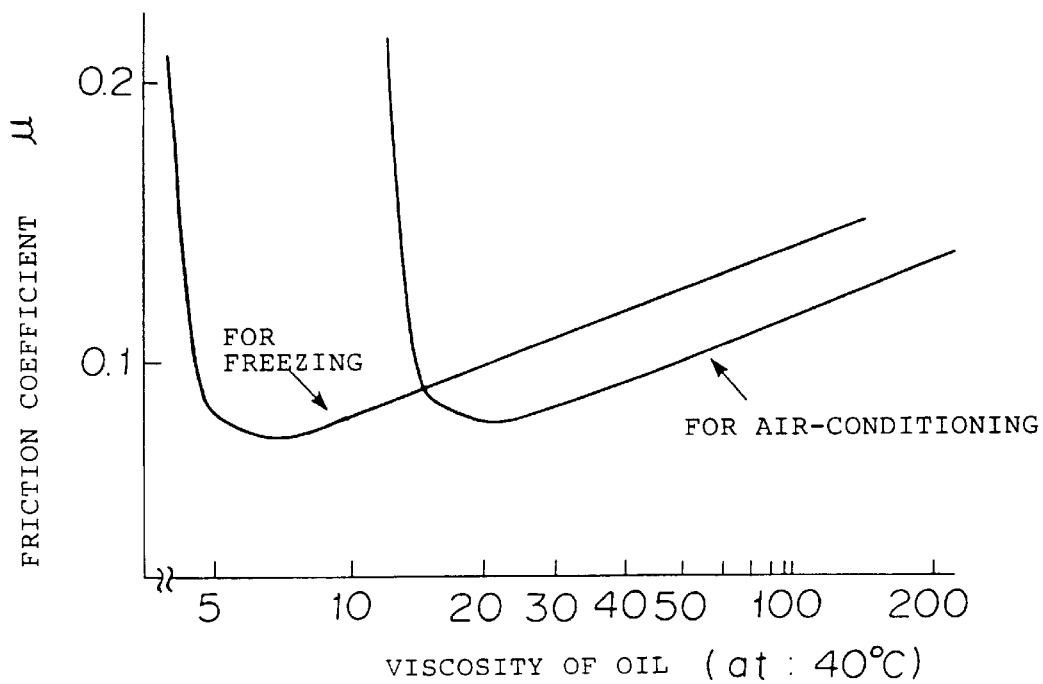
FIG. 5 is a characteristic view showing the friction coefficients by the viscosity grades of the refrigerator oils used for the refrigerant-circulating system according to Embodiment 1.

FIG. 5 shows the effect of the viscosity grade of the aromatic polyether oil on the friction coefficient $\mu$. Further, FIG. 4 shows the effect of the viscosity grade of the aromatic polyether oil on the compressor efficiency η. These are determined based on the base oil structure and the viscosity index as mentioned above and solubility properties. However, depending upon the operational temperature range of the refrigerant-circulating system and the type of the refrigerant compressor 1, the optimum viscosity range is different between the case for freezing or refrigeration and case for air-conditioning or dehumidification, and the optimum viscosity range may be set as mentioned below.

In the refrigerant-circulating system for freezing or refrigeration, a refrigerant such as R134a, R404A or R407C is employed, and the refrigerant-evaporating temperature range of the refrigeration cycle is from −45 to 0° C., whereby a flowability at a low temperature is demanded. Accordingly, it is most favorable to use an aromatic polyether having a viscosity grade of from 5 to 50 cSt at 40° C. In the refrigerant-circulating system for air-conditioning or dehumidification, a refrigerant such as R410A or R407C is employed, and the evaporation temperature range in the refrigeration cycle is from −20 to +20° C. Accordingly, by adjusting the viscosity at a level of from 20 to 80 cSt at 40° C., it is possible to obtain a refrigerator oil suitable from the aspect of the efficiency and reliability.

Figure 6:
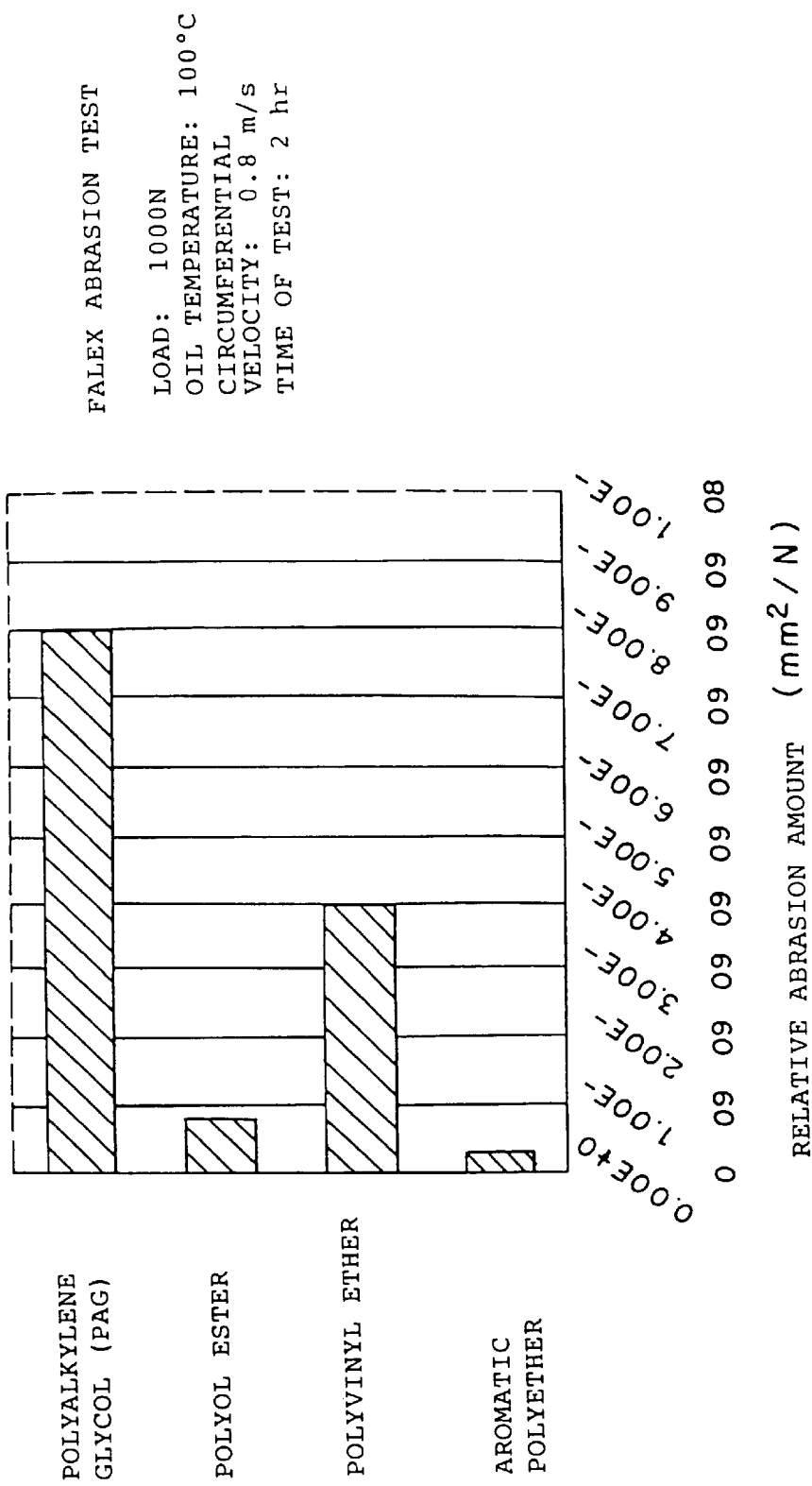
FIG. 6 is a characteristic view showing the lubricities of the refrigerator oils used for the refrigerant-circulating system according to Embodiment 1.

Then, FIG. 6 shows the comparison in the lubrication property between the aromatic polyether oil and the conventional polyvinyl ether oil, polyol ester oil and PAG oil. The comparison is represented by the specific wearing amount obtained by a FALEX wearing test. It is clearly understood that in the lubrication property, the aromatic polyether oil is remarkably superior to not only the conventional refrigerator oils such as polyvinyl ether oil and PAG oil, but also the ester oil. By such an advantage, even in the case employing an alternative refrigerant containing no chlorine such as hydrofluorocarbon (HFC), extraordinary wearing or seizure will not be caused at the compressing element portion of the refrigerant compressor.

Further, at the portion at which severe sliding conditions are required, for example, at the terminal end of the vane and the outer periphery of the rolling piston of a high-pressure rotary-type refrigerant compressor for which most severe lubrication conditions are demanded, extraordinary wearing or scuffing is not caused and good sliding properties can be obtained without adding additives for improving the lubricity such as an extreme-pressure additive or an oiliness improver.

Embodiment 1 shows the case where the refrigerant is hydrofluorocarbon (HFC) containing no chlorine. However, the same effects can be obtained when the refrigerant is a so-called third generation refrigerant containing no chlorine and having a smaller warming coefficiency, like fluorine-containing hetero compounds, for example, a fluorine-containing alcohol (such as $(CH_3)_3COH$, or $CF_3CF_2(OH)CF_3$), a fluorine-containing ether (such as $CF_3CH_2OCHF_2$, $CHF_2CF_2OCH_3$, $CF_3CH_2OCF_3$ or $CF_3CF_2OCH_3$), a fluorine-containing amine (such as $(CF_3)_2NCH_3$) and a fluorine-containing alkoxysilane (such as $(CH_3)_2Si(OCH_2CF_2CF_3)_2$) which are refrigerants having a critical temperature of at least 40° C. and containing no chlorine, as well as ammonia or the like.

Embodiment 2

In Embodiment 1, the aromatic polyether oil is used as the refrigerator oil. Hereinafter, the case where the aromatic polyether having the above base oil structure is mixed with an alkylbenzene oil will be described.

In the refrigerant compressor 1, the electrically driving element 8 and the compressing element 9 are enclosed in the closed container 2, and the electrically driving element 8 is immersed in the refrigerator oil 10 stored at the bottom of the closed container 2 or in the state such that it is sprayed with the oil in a mist state. The electrically driving element 8 of the refrigerant compressor 1 is cooled by the stream of a refrigerant gas having the refrigerator oil 10 dissolved therein. Further, when the refrigerant compressor 1 is stopped, the liquid refrigerant is stored within the refrigerant compressor 1, and the electrically driving element 8 is in a state such that it is immersed in a liquid refrigerant having the refrigerator oil 10 dissolved therein. Accordingly, when the volume resistivity of the refrigerator oil 10 is small, failure in insulation or leakage of electric current in the refrigerant compressor 1 may be increased, and further the electrically driving element 8 may sometimes be burnt.

The ether bond is generally inferior to the ester bond in the electric insulation property. The ones disclosed in JP-A-1-259093 having propylene glycol monoether (PAG) as the base oil and the ones of a diether type disclosed in JP-A-1-259094, have a volume resistivity at a level of $10^9$ Ω-cm, and these are hardly used as the refrigerator oil 10 of the closed type compressor having the electrically driving element 7 in the closed container 2 due to their low volume resistivities. The aromatic polyether has an aromatic structure in the base oil structure and its electron arrangement is different from the above, whereby the insulation properties can be improved and the insulation resistance is at a level of from $10^{12}$ to $10^{13}$ Ω-cm, by which the aromatic polyether can be practically used for the refrigerator oil 8 in the closed type compressor having the electrically driving element 7 in the closed container. However, conventional hydrocarbon oils such as a paraffin type mineral oil, a naphthene type mineral oil and an alkylbenzene oil, have a volume resistivity at a level of from $10^{14}$ to $10^{15}$ Ω-cm, and the aromatic polyether is somewhat inferior to them in this respect.

By adjusting the viscosity by incorporating an alkylbenzene oil having a high insulation property into the aromatic polyether oil having the above base oil structure, it is possible to provide a refrigerator oil 8 having a higher volume resistivity and an excellent insulation property. The incorporation of the alkylbenzene tends to worsen the compatibility with the refrigerant, but it is assumed that if the mixing ratio thereof is within the range of from 10 to 60 wt %, the compatibility with the refrigerant such as hydrofluorocarbon (HFC) can be secured within the operational range of the refrigerant-circulating system and the volume resistivity can be secured at the level of $10^{14}$ Ω-cm.

Here, description is made with respect to the case where the aromatic polyether oil and the alkylbenzene oil are mixed and used as the refrigerator oil. However, the oil to be mixed may be other hydrocarbon oils having a high insulation property, and similar effects can be obtained even if highly purified hydrocarbon oils such as a paraffin type mineral oil or a naphthene type mineral oil, are used alone or as a mixture in combination thereof.

Embodiment 3

Embodiment 2 shows the case where the aromatic polyether oil or its oil mixture is used as the refrigerator oil. However, by adding various additives to the refrigerator oil, the lubricity, thermal stability and chemical stability can further be improved. The improvement of the lubricity can be accomplished by adding an extreme-pressure additive to the aromatic polyether oil. As the extreme-pressure agent, a phosphate such as tricresyl phosphate of the following formula (11) may be mentioned.

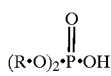

(11)

where R is an alkyl group.

In the refrigeration cycle employing a refrigerant containing no chlorine, such as hydrofluorocarbon (HFC), although the addition of the extreme-pressure additive improves the wearing resistance and anti-seizing property, this agent may react with metallic surface at the frictional surface to form metallic soaps such as iron salts of phosphoric acid, which are deposited as a sludge in the expansion mechanism and sometimes cause clogging of the expansion mechanism. Accordingly, adequate studies should be made on the type and amount of the extreme-pressure additive.

When the aromatic polyether oil having the above base oil structure or its mixed oil is used as the refrigerator oil, a phosphate, an alkylphosphorothionate and arylphosphorothionate are favorable as the extreme-pressure additive or the oiliness improver. As the phosphate, tricresyl phosphate, triphenyl phosphate, phenylisopropylphenyl phosphate, diphenylisopropylphenyl phosphate and tris (isopropylphenyl)phosphate are preferred. As the alkylphosphorothionate, trimethylphosphorothionate, triethylphosphorothionate, tributylphosphorothionate, trioctylphosphorothionate and tridecylphosphorothionate may be mentioned, and as the arylphosphorothionate, triphenylphosphorothionate may be mentioned.

Further, it is experimentally found that the optimum added amount of this additive is within a range of from 0.1 to 2 wt % based on the refrigerator oil.

Then, an antioxidant is effective to prevent oxidation or deterioration of the oil during the distribution or storage, or the oxidation or deterioration of the refrigerator oil used at a high temperature and a high pressure. As the antioxidant, ones of a hindered phenol type, an amine type, a sulfur type or the like, for example, 2,2'-thiobis(4-methyl-6-t-butylphenol), alkylphenothiazine-1-carboxylate, phenyl-2-naphthylamine, 2,6-di-t-butyl-2-dimethyl-p-cresol and alkyldisulfide may be mentioned. The optimum added amount thereof is within a range of from 0.05 to 1 wt %.

Further, an acid remover is effective to prevent thermal or chemical deterioration of the refrigerator oil, and among epoxy compounds, phenyl glycidyl ether, alkylphenyl glycidyl ether, 1,2-epoxyalkane and vinylcyclohexene dioxide may be mentioned. Its optimum added amount is within a range of from 0.05 to 1 wt %.

Then, a metal deactivator has effects such that the reaction with the surface of the sliding part in the refrigerant compressor or the surface of copper pipelines of the refrigerant circuit can be suppressed. As the metal deactivator, alizarin, quinizarin, benzotriazole, oil-soluble benzotriazole, mercaptobenzotriazole and the like may be mentioned. The optimum added amount thereof is within a range of from 0.01 to 0.5 wt %.

Further, when the refrigerant compressor is stopped for a long time, a liquid refrigerant stays in the refrigerant compressor in such a state that it is dissolved in the refrigerator oil. When the refrigerant compressor is re-started from such a state, the liquid refrigerant is evaporated and bubbles are rapidly formed. It may be assumed to add a defoaming agent for the purpose of buffering the formation of bubbles of the refrigerator oil at the time of flooded start, i.e. "start-up in the state that the refrigerant is kept in a liquid state".

Embodiment 4

Figure 7:
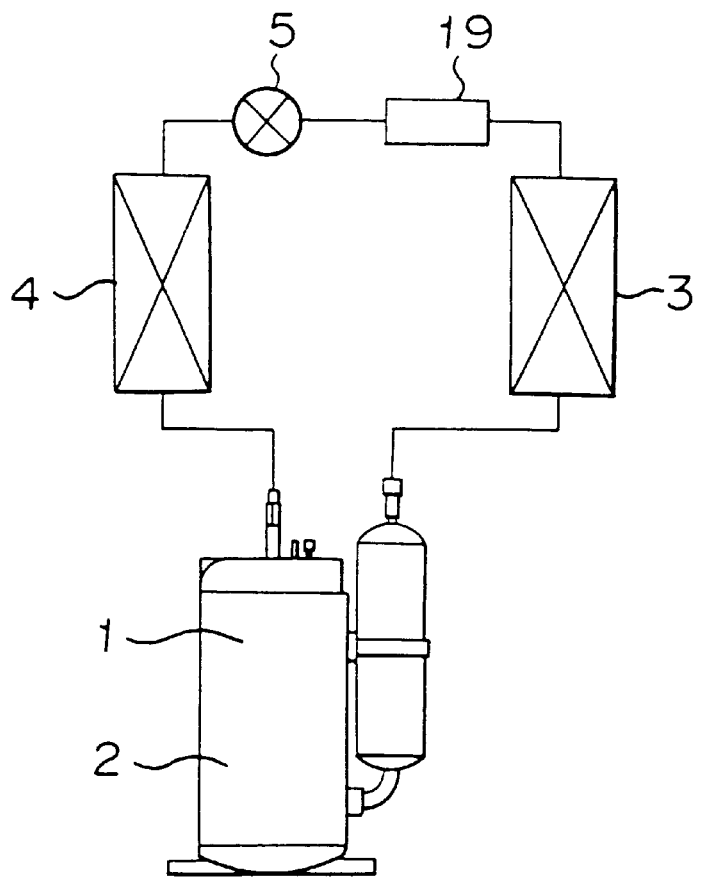
FIG. 7 is a view of a circuit structure showing a refrigerant-circulating system according to Embodiment 4.
Figure 8:
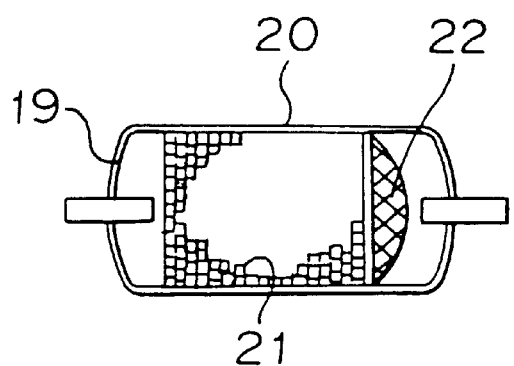
FIG. 8 is a cross-sectional view showing a dryer used for the refrigerant-circulating system according to Embodiment 4.

Embodiment 3 shows an example where the aromatic polyether oil having the above base oil structure or its mixed oil is used as the refrigerator oil for the refrigerant circuit comprising the refrigerant compressor, condenser, expansion mechanism and evaporator. FIG. 7 shows an example where a drying agent is used for the purpose of removing water content incorporated in the refrigerant circuit. FIG. 8 shows a cross-sectional view of a dryer. In FIG. 7, 19 is a dryer having the drying material enclosed therein, and generally disposed in the liquid refrigerant line between the expansion mechanism 5 and the evaporator 3 in the refrigeration cycle. 20 is a dryer container, 21 is a drying material enclosed in the dryer container, and 22 is a storainer. As the material of the drying material 21, it is required not to be activated alumina, and molecular sieves, synthetic zeolite and the like may be used.

Further, with respect to the aromatic polyether oil, no hydrolysis due to the incorporation of water content is caused and there is no risk such that the refrigerator oil is deteriorated and sludges are formed, the saturated water content of the refrigerator oil itself is as high as 2,000 to 3,000 ppm, whereas that of conventional alkylbenzene, paraffin type mineral oil and naphthene type mineral oil is at a level of from a few hundreds ppm. Accordingly, in the use of the aromatic polyether oil, depending upon the manufacturing condition or installation condition of the refrigerant-circulating system, when a large amount of water content is incorporated in the refrigerant circuit, it is conceivable that a large amount of water content is incorporated in the refrigerator oil itself. This water content may deteriorate organic materials used for the refrigerant circuit, change the operational conditions due to freezing at a low temperature portion in the refrigerant circuit, or form clogging in the expansion mechanism. From such viewpoints, it is extremely effective for the refrigerant-circulating system employing the refrigerator oil according to the present invention to dispose the drying agent which removes the water content in the refrigeration cycle.

Table 1 shows the deterioration of refrigerator oils after acceleration tests in a working machine wherein generally used drying materials are disposed. Here, it is found that when activated alumina most generally used among conventional drying materials is used, the residual amount of the extreme-pressure additive is remarkably reduced among the residual amounts of the refrigerator oil additives. This shows that the extreme-pressure additive of the refrigerator oil is adsorbed in the activated alumina, and when long term operation is made, there is a risk such that the extreme-pressure agent added for the improvement of lubricity of the refrigerator oil will be lost and wearing and seizing will be caused. In the cases using drying materials other than activated alumina, the reduction of the residual amount of the additives is small, and the additives will not be lost until the life end for the necessary life time of the refrigerant-circulating system on market and it is thereby possible to provide a high reliable machineries.

TABLE 1

Results of analysis of refrigerator oil after acceleration life test by machine

| Dryer No. | 1 | 2 | 3 | 4 |
|---|---|---|---|---|
| Drying material | Activated alumina | Molecular sieves XH10C | Molecular sieves HX11 | Synthetic zeolite |

TABLE 1-continued

Results of analysis of refrigerator oil after acceleration life test by machine

| Dryer No. | | 1 | 2 | 3 | 4 |
|---|---|---|---|---|---|
| Residual amount of additive | Extreme-pressure additive 1 | 31% | 85% | 91% | 79% |
| | Extreme-pressure additive 2 | 64% | 98% | 78% | 85% |
| | Antioxidant | 82% | 79% | 89% | 91% |
| | Acid remover | 79% | 82% | 85% | 79% |
| | Metal deactivator | 93% | 91% | 85% | 90% |
| | Defoaming agent | 95% | 89% | 85% | 92% |

Embodiment 5

Embodiment 4 shows the refrigerant-circulating system employing the aromatic polyether oil or its mixed oil as the refrigerator oil for the refrigerant-circulating system having the refrigerant containing no chlorine charged therein. However, the present invention may be applied to the case where from a refrigerant-circulating system which is already manufactured, distributed and installed and being at work, employing chlorofluorocarbon (CFC), hydrochlorofluorocarbon (HCFC) or the like containing chlorine as a refrigerant, the refrigerant containing chlorine is discharged and replaced with a refrigerant containing no chlorine such as hydrofluorocarbon (HCFC) (so-called retrofitting operation). And the same effect can be obtained when the present invention is applied to the case where a refrigerator oil for the chlorofluorocarbon (CFC) or hydrochlorofluorocarbon (HCFC), for example, alkylbenzene, a paraffin type mineral oil or a naphthene type mineral oil or its mixed oil which is already charged, is replaced with the aromatic polyether oil having the above base oil structure or its mixed oil, or the case where an existent refrigerant compressor is replaced with a refrigerant compressor having the aromatic polyether oil or its mixed oil charged as a refrigerator oil therein, whereby it is possible to provide an extremely highly reliable refrigerant-circulating system.

Figure 9:
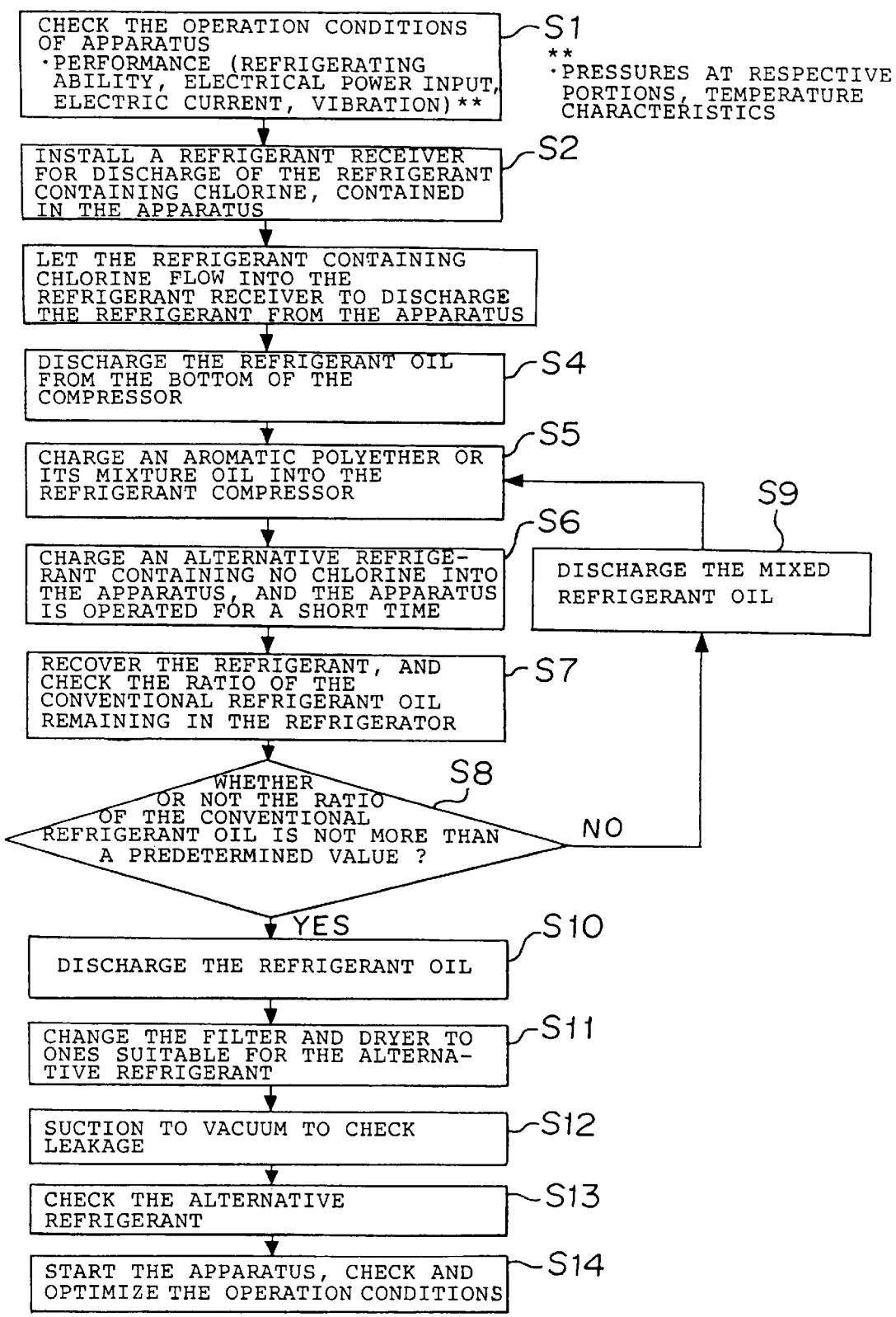
FIG. 9 is a flowchart showing a retrofitting operation of the refrigerant-circulating system according to the present invention.

FIG. 9 shows a flowchart for the retrofitting operation wherein the refrigerant of an existent refrigerant-circulating system is replaced with an alternative refrigerant containing no chlorine.

In the retrofitting operation, firstly, in step S1, the operational conditions of an apparatus are checked. Then, in step S2, a refrigerant receiver for discharging the charged refrigerant containing chlorine, is installed to the apparatus. Then, in step S3, the refrigerant containing chlorine is transferred to the refrigerant receiver to discharge it out of the apparatus. In step S4, the charged refrigerator oil is discharged from the bottom of a compressor. Then, in step S5, an aromatic polyether or its mixed oil is charged in the refrigerant compressor. In step S6, an alternative refrigerant containing no chlorine is charged in the apparatus, and the apparatus is operated for a short period of time. Then, in step S7, the refrigerant is recovered, and the ratio of the conventional refrigerator oil remaining in the refrigerator oil is checked, and then the program proceeds to step S8.

In step S8, it is determined whether or not the ratio of the remaining conventional refrigerator oil is not more than a predetermined value. If it is more than the predetermined value, the program proceeds to step S9 wherein the refrigerator oil mixture is discharged, and then the program returns to step S5 and subsequently proceeds to steps S6 and S7. Further, in step S8, it is again determined whether or not the ratio of the remaining conventional refrigerator oil is not more than the predetermined value. If it is not more than the predetermined value, the program proceeds to step S10 wherein the refrigerator oil is discharged. After the refrigerator oil is discharged in step S10, a filter and a dryer are replaced with ones suitable for the alternative refrigerant in step S11. In step S12, the presence or absence of leakage is checked by suction to vacuum, and in step S13, the alternative refrigerant is charged. Finally, in step S14, the apparatus is operated to check the operational conditions and adjusted for optimization.

As clearly understood from the retrofitting operation indicated in FIG. 9, in the retrofitting work, the conventional refrigerant containing chlorine and the conventional refrigerator oil for such a refrigerant can not be completely discharged from the apparatus and the apparatus is operated under such condition that the refrigerant or the refrigerator oil containing a slight amount of chlorine remains in the refrigerant-circulating system. Accordingly, when the refrigerator oil is highly contamination resistant and thermally and chemically stable like the refrigerator oil of the present invention, extremely excellent reliability can be obtained even if the water content is incorporated as compared with the conventional refrigerator oil suitable for alternative refrigerants.

Further, Embodiment 5 shows the case where the refrigerant containing chlorine in the refrigerant-circulating system is replaced with the refrigerant containing no chlorine. However, the present invention may be applied to the case where in a refrigerant-circulating system employing a refrigerant containing no chlorine such as hydrofluorocarbon (HFC), from such a refrigerant-circulating system already manufactured and distributed or installed and at work, a refrigerator oil such as an ester oil suitable for such a refrigerant containing no chlorine is discharged and replaced with the aromatic polyether oil having the above base oil structure or its mixed oil. Even if a slight amount of chlorine is incorporated, the reliability of the apparatus can substantially be improved by virtue of excellent properties as compared with conventional refrigerator oil such as an ester oil suitable for the refrigerant containing no chlorine, as mentioned above.

Embodiment 6

Figure 10:
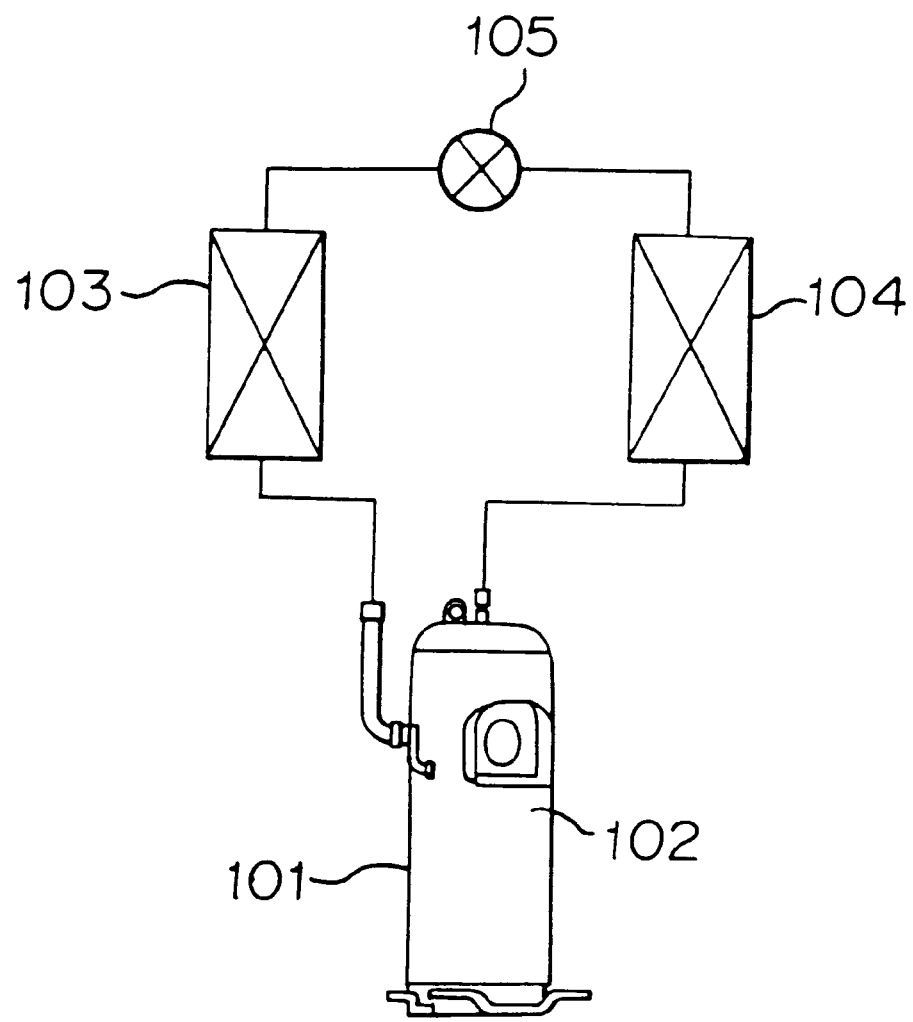
FIG. 10 is a view showing a refrigeration cycle according to Embodiment 6.
Figure 11:
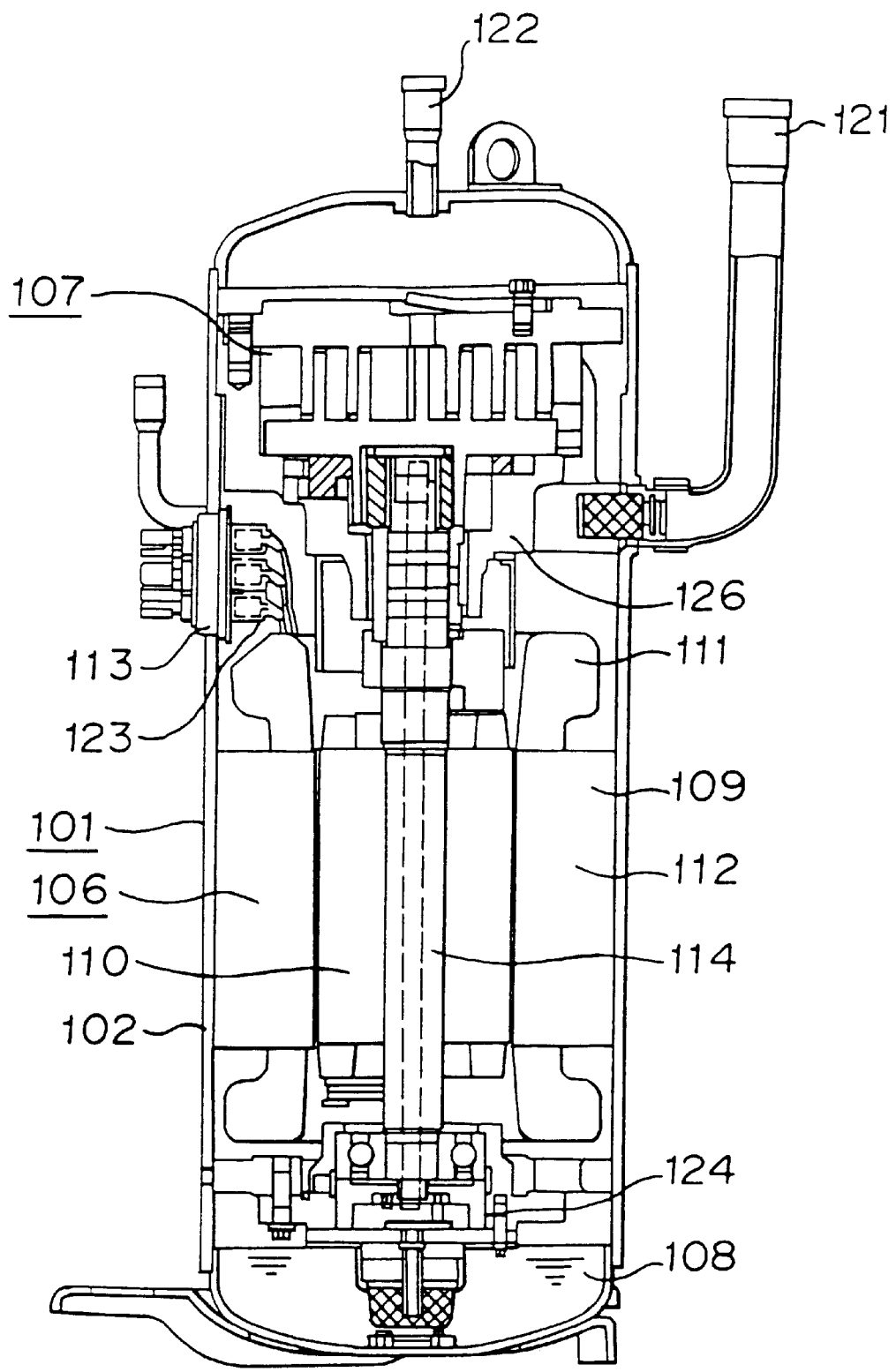
FIG. 11 is a vertical cross-sectional view of a refrigerant compressor (scroll type) used for the refrigeration cycle according to Embodiment 6.

FIG. 10 is a view showing a refrigeration cycle according to Embodiment 6 of the present invention, and FIG. 11 is a vertical cross-sectional view of a so-called scroll type refrigerant compressor used for the refrigeration cycle. In the drawings, structures or parts corresponding to conventional refrigeration cycle or refrigerant compressor are indicated by the same numerals and explanation thereof will be omitted.

A refrigeration oil 108 is stored at the bottom of a closed container 102 of a refrigerant compressor 101. Here, as the refrigerator oil, the aromatic polyether having as a base oil structure a benzene ring having an ether bond as described in Embodiment 1, is employed.

In this Embodiment, as the refrigerant, carbon dioxide ($CO_2$) or ammonia ($NH_3$) which contains no chlorine and has a high polarity, is charged.

Further, as a hermetically sealed terminal 113, a shrinkable tube 123 formed from a resin excellent in the electrical insulation property and corrosion resistance, for example, polyethylene terephthalate (PET), polyphenylene sulfide (PPS), polybutylene terephthalate (PBT), a nylon resin, polyethylene naphthalate, a polyimide resin, a polyamide-imide resin, polyether sulfone, polyether ether ketone, polysulfone, a fluorine type resin (polytetrafluoroethylene or the like), silicone and the like, may be used. As shown in FIG. 11, at the time of bonding wirings, each terminal is covered with the shrinkable tube 123, and the terminal is completely sealed with the shrinkable tube 123 in the closed container 102, whereby the insulation property of the terminal electroconductive portion can be secured.

Further, in an oil-supplying pump for a scroll-type refrigerant compressor 101 as shown in FIG. 11, as the material for an O-ring 124 used as a sealing material, a non-polar rubber such as natural rubber, styrene butadiene rubber, butadiene rubber, ethylenepropylenediene monomer or butyl rubber, or a hydrogenated nitrile rubber, is used. Further, a wiring of a wiring portion 111 of a stator 109 of a motor is composed of a core wire coated with an enamel coating of an insulating coating material, and an electrical insulation film (not shown) is disposed on the inner wall of a wiring hole of a core portion 112 of the stator 109, to sufficiently secure the insulation between the core portion and the wiring of the wiring portion 111. The insulation film of the enamel coating material is formed by at least one selected from polyester/polyamide (the inside is polyester and the outside is polyamide, hereinafter the same applies), polyesterimide, polyester/polyamideimide, polyesterimide/polyamideimide, polyamideimide and polyimide. The electrical insulation film material is at least one selected from polyethylene terephthalate, polybutylene terephthalate, polyphenylene sulfide, polyethylene naphthalate, a fluorine type resin film, polyamideimide and polyimide.

Hereinafter, this embodiment will be described in more detail.

In the refrigeration cycle as shown in FIG. 10, since the aromatic polyether oil having the base oil structure of the present invention is used as the refrigerator oil 108, the solubility in a $CO_2$ or $NH_3$ refrigerant having a high polarity is good by virtue of the ether bond, and even if the refrigerator oil 108 flows out of the closed container 102 of the refrigerant compressor 101 along with the discharged refrigerant, the refrigerator oil is readily circulated within the refrigeration cycle in a state such that it is dissolved in the refrigerant, and returned to the closed container 102. Accordingly, failure in lubrication at the sliding parts such as bearings due to the shortness of the refrigerator oil in the refrigerant compressor, will not be caused.

As described in Embodiment 1, FIG. 3 shows a critical solubility curve of the aromatic polyether oil and conventional polyol ester oil with the refrigerant (hydrofluorocarbon HFC) having a high polarity for comparison of solubility. It is clearly understood that the aromatic polyether oil having the base oil structure of the present invention can be solved in the HFC refrigerant within an extremely wide temperature range as compared with the polyol ester oil.

In the above comparison, the HFC refrigerant is employed as the refrigerant. However, the similar tendency can be seen when carbon dioxide ($CO_2$) or ammonia ($NH_3$) as a refrigerant having a high polarity, is employed.

Further, since the aromatic polyether oil has a structure having an ether bond and containing no ester group in the molecule as indicated in the above formula, it does not undergo hydrolysis in the presence of the water content unlike the ester oil. Accordingly, the aromatic polyether oil is unlikely to cause dangers such that deterioration is accelerated at the frictional surface and the reaction with metals forms metallic soaps, whereby clogging of the expansion mechanism 105 is formed in the refrigeration cycle. By such advantage, with respect to products like an air-conditioner wherein the exterior device and the interior device are connected by installation work, even if in the worst case on the market wherein a large amount of water is incorporated, for example, the work in the rain or the work utilizing conventional existent pipelines, it is possible to provide an extremely highly reliable refrigeration cycle.

Embodiment 6 shows a case using the refrigeration cycle having each one of the condenser, evaporator and expansion mechanism in the system. However, the cycle may be a refrigeration cycle having plural numbers of the condensers, evaporators and expansion mechanisms like a multi-type air-conditioner which is being increased in recent years and has a plurality of internal devices to one external device. In such a case, since the length of the pipelines of the entire refrigeration cycle is long, he refrigerator oil of the present invention is more advantageous in the flowability and oil recovery by virtue or its good compatibility with the refrigerant. Further, since the amount of contamination such as water content incorporated therein is relatively large, the refrigerator oil of the present invention shows considerably low possibility of deterioration relative to the ester oil.

The aromatic polyether having the base oil structure of the present invention shows a volume resistivity at a level of from $10^{12}$ to $10^{-}$ $\Omega$-cm, which is a practically useful level as the refrigerator oil 108 of the refrigerant compressor 101 having an electrically driving element 106 in the closed container 102. However, conventional hydrocarbon type oils such as a paraffin type mineral oil, a naphthene type mineral oil and an alkylbenzene oil, has a volume resistivity at a level of from $10^{14}$ to $10^{15}$ $\Omega$-cm, and the aromatic polyether is somewhat inferior to them in this respect. Accordingly, each terminal of the hermetically sealed terminal 113 is covered with the shrinkable tube formed by a resin excellent in the electrical insulation property and corrosion resistance, for example, polyethylene terephthalate (PET), polyphenylene sulfide (PPS), polybutylene terephthalate (PBT), a nylon resin, polyethylene naphthalate, a polyimide resin, a polyamideimide resin, polyether sulfone, polyether ether ketone, polysulfone, a fluorine type resin (polytetrafluoroethylene or the like), or silicone at the time of bonding wirings. Then, each terminal is completely sealed with the shrinkable tube 123 in the closed container 102 to secure the insulation property at the terminal electroconductive portion, whereby the reliability of the refrigerant compressor and the refrigeration cycle can be improved.

In this Embodiment, the above resinous shrinkable tube 123 is mentioned to secure the insulation property of the hermetically sealed terminal 113. However, same effects as this Embodiment can be obtained so long as the hermetically sealed terminal 113 is covered and completely sealed in the refrigerant compressor 101, for example, at the time of bonding wirings, each terminal is covered with a terminal cover formed by a resin such as polyethylene terephthalate (PET), polyphenylene sulfide (PPS), polybutylene terephthalate (PBT), a nylon resin, polyethylene naphthalate, a polyimide resin, a polyamideimide resin, polyether sulfone, polyether ether ketone, polysulfone, a fluorine type resin (such as polytetrafluoroethylene) or silicone, and then fixed with an additive of e.g. a Si type.

In the oil-supplying pump of the scroll-type refrigerant compressor as shown in FIG. 11, since a non-polar rubber such as natural rubber, styrene butadiene rubber, butadiene rubber, ethylenepropylenediene monomer or butyl rubber, or a hydrogenated nitrile rubber is employed as the material of the O-ring 124 used as the sealing material, such a material is hardly susceptible to deterioration such as swelling against the combination of the refrigerant having a high polarity and the refrigerator oil 108 according to the present Embodiment, whereby highly reliable refrigerant compressor and refrigeration cycle can be obtained.

Further, the enamel coating material of the core wire of the wiring 111 of the stator 109 of the motor is made of an insulation layer of at least one selected from polyester/polyamide (the inside is polyester and the outside is polyamide, hereinafter the same applies), polyesterimide, polyester/polyamideimide, polyesterimide/polyamideimide, polyamideimide and polyimide. The material of the electrical insulation film (not shown) disposed on the inner wall of the wiring hole of the core portion 112 of the stator 109 through which the wiring of the wiring portion 111 passes, is made of at least one selected from polyethylene terephthalate, polybutylene terephthalate, polyphenylene sulfide, polyethylene naphthalate, a fluorine type resin, polyamideimide and polyimide. Such a material has chemical resistance and corrosion resistance against the combination of the refrigerant having a high polarity and the refrigerator oil according to the present invention, and can be used without problem in the reliability.

In this Embodiment, $CO_2$ or $NH_3$ is used as the refrigerant. However, the same effects can be obtained with respect to a so-called third generation refrigerant which contains no chlorine and has a low warming coefficiency so long as the refrigerant is a substance having a high polarity, for example, hydrofluorocarbon (HFC) containing no chlorine, or a fluorine-containing hetero compound such as a fluorine-containing alcohol (such as $(CH_3)_3COH$ or $CF_3CF_2CH(OH)CF_3$), a fluorine-containing ether (such as $CF_3CH_2OCHF_3$, $CHF_2CF_2OCH_3$, $CF_3CH_2OCF_3$ or $CF_3CF_2OCH_3$), a fluorine-containing amine (such as $(CF_3)_2NCH_3$) and a fluorine-containing alkoxysilane (such as $(CH_3)_2Si(OCH_2CF_2CF_3)_2$)

Embodiment 7

Figure 12:
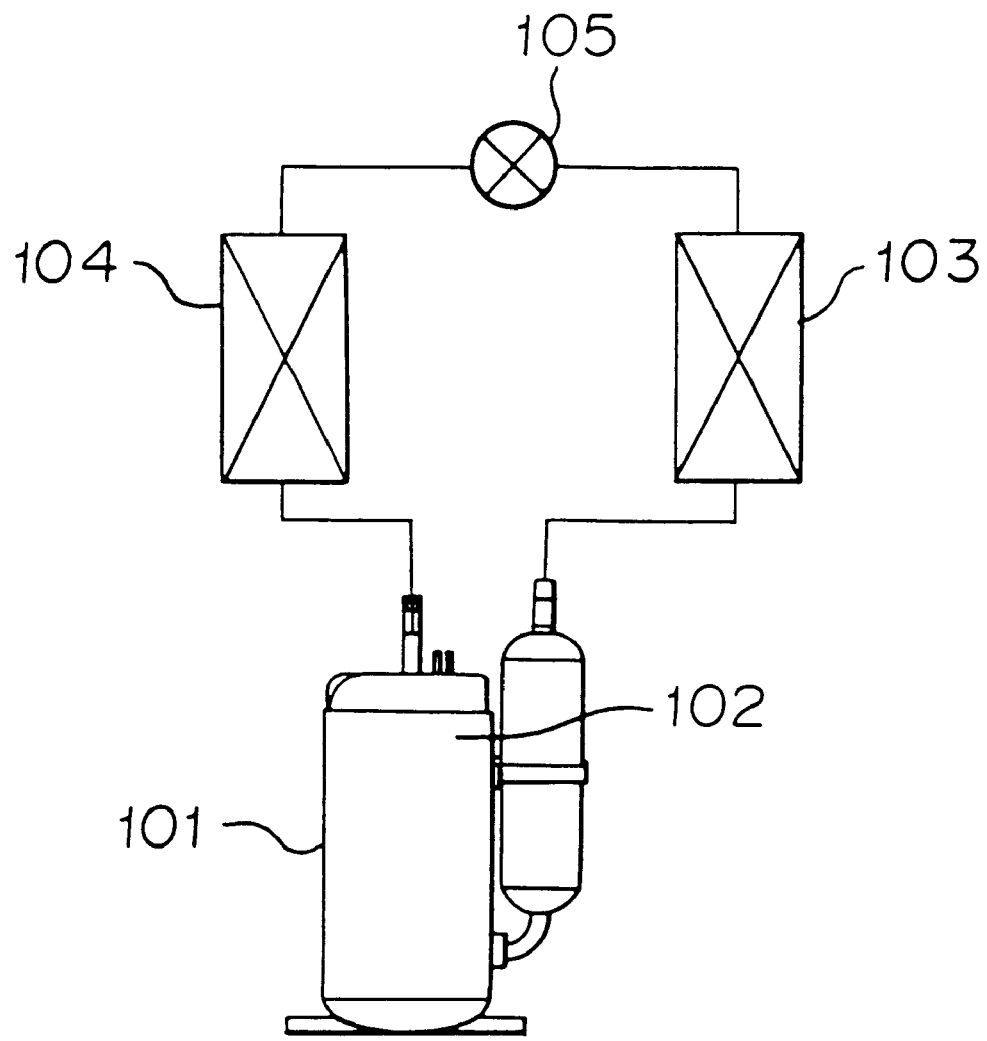
FIG. 12 is a view showing a refrigeration cycle according to Embodiment 7.
Figure 16A:
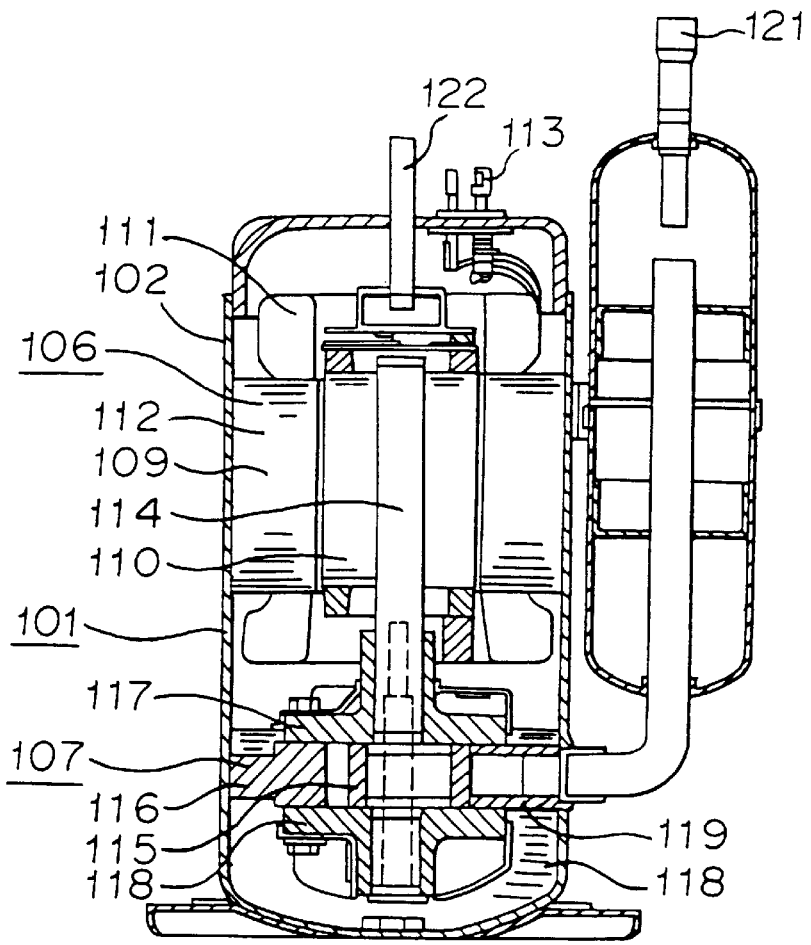
FIG. 16 is a cross-sectional view showing a refrigerant compressor used for the conventional refrigeration cycle.
Figure 16B:
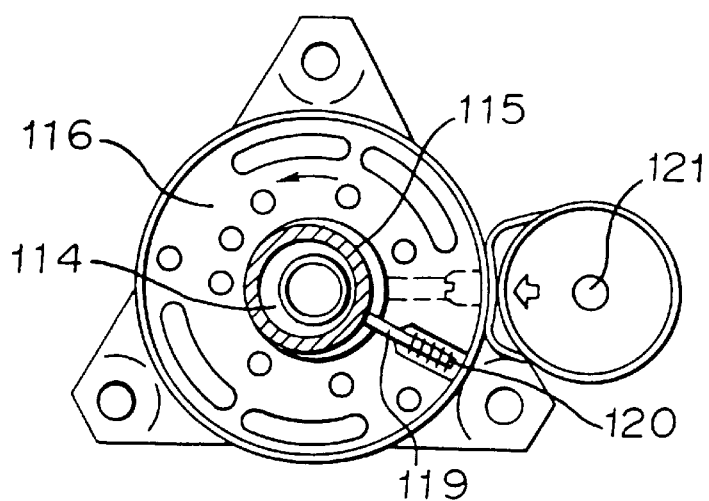

FIG. 12 is a view showing a refrigeration cycle according to Embodiment 7, and FIG. 13 shows a cross-sectional view of a rotary-type refrigerant compressor used for the refrigeration cycle. In these drawings, the structure and operation corresponding to those of conventional refrigerant compressor are indicated with the same numeral and explanation thereof will be omitted.

A refrigeration oil 108 is stored at the bottom of a closed container 102 of a refrigerant compressor 101. Here, as the refrigerator oil 108, an aromatic polyether having a base oil structure of the present invention is employed as in Embodiment 6.

As the refrigerant, $CO_2$ or $NH_3$ is charged. However, as mentioned above, it is possible to employ a so-called third generation refrigerant material which contains no chlorine and has a low warming coefficiency so long as the refrigerant is a material having a high polarity, for example, hydrofluorocarbon (HFC) containing no chlorine, a fluorine containing hetero compound such as a fluorine-containing alcohol (such as $(CH_3)_3COH$ or $CF_3CF_2CH(OH)CF_3$), a fluorine-containing ether (such as $CF_3CH_2OCHF_3$, $CHF_2CF_2OCH_3$, $CF_3CH_2OCF_3$ or $CF_3CF_2OCH_3$), a fluorine-containing amine (such as $(CF_3)_2NCH_3$) and a fluorine-containing alkoxysilane (such as $(CH_3)_2Si(OCH_2CF_2CF_3)_2$).

Further, as a material of bearings 117 and 118 for the refrigerant compressor 101, an impregnated bronze material or a carbon material (C:80%+Al:20% or C:100%) is employed. The impregnated bronze material is the one obtained by impregnating a bronze material as a matrix material with, for example, a mixture of polytetrafluoroethylene (PTFE) and lead (hereinafter referred to as a PTFE impregnated material) or the one obtained by impregnating a bronze material with a mixture of PTFE, lead, graphite and bronze powder. As a material for a vane spring 120, a SUS material having a corrosion resistance is employed.

Further, in the refrigerant compressor 101 according to this Embodiment, a hermetically sealed terminal 113 is disposed at the upper portion of the closed container 102.

The operation according to the present Embodiment will be described.

As mentioned in Embodiment 1, FIG. 6 shows a comparison of the lubrication property between the aromatic polyether oil having the base oil structure of the present invention and conventional polyvinyl ether oil, polyol ester oil and PAG oil. The comparison is represented by the relative wearing amount obtained by a FALEX wearing test. It is clearly understood that the aromatic polyether oil having the base oil structure of the present invention is not only remarkably superior to conventional ether type refrigerator oil such as polyvinyl ether oil or PAG oil, but also superior to ester oil. By such an advantage, even if an alternative refrigerant containing no chlorine such as hydrofluorocarbon (HFC) is employed, no extraordinary wearing or seizure will be caused at the compressing element of the refrigerant compressor.

Further, even at the portions for which severe sliding conditions are demanded, for example, the terminal end of the vane or the outer periphery of the rolling piston of the high-pressure rotary type refrigerant compressor for which severe lubrication conditions are demanded, no extraordinary wearing or scuffing will be caused without adding an additive which improves the lubricity such as an extreme-pressure additive or an oiliness improver, whereby excellent sliding properties can be obtained.

The material for the bearings 117 and 118 of the refrigerant compressor 101 is explained above. FIG. 14 shows seizure properties with respect to the combination of the aromatic polyether oil having the base oil structure of the present invention and R407C which is a non-azeotropic mixed refrigerant of R134a, R32 and R125 which are hydrofluorocarbon (HFC). It is clearly understood that when the PTFE impregnated bearing has a bronze exposure ratio on surface of at least 80% (the case where the impregnated amount of PTFE and lead is small and the matrix material is exposed on at least 80% of the surface), its seizure resistance is lower than that of an Al metallic bearing (Al—Pb), whereas when the bronze exposure ratio on surface is at most 50% (the case where the impregnated amount of PTFE and lead is large and the matrix material is exposed on at most 50% of the surface), its seizure resistance substantially increases as compared with the Al metallic bearing (Al—Pb). Further, in the case of a carbon bearing (C:80%+Al:20%, C:100%); the seizure resistance is high as compared with the Al metallic bearing (Al—Pb), whereby the reliability is high in a practical use.

With respect to the aromatic polyether oil having the base oil structure of the present invention, no hydrolysis due to the incorporation of water content is caused and there is no risk such that the refrigerator oil is deteriorated and sludges are formed, the saturated water content of the refrigerator oil itself is as high as 2,000 to 3,000 ppm, whereas that of conventional alkylbenzene, paraffin type mineral oil and naphthene type mineral oil is at a level of from a few hundreds ppm. Accordingly, in the use of the aromatic polyether oil, depending upon the manufacturing condition or installation condition of the refrigerant-circulating system, when a large amount of water content is incorporated in the refrigerant circuit, it is conceivable that a large amount of water content is incorporated in the refrigerator oil itself. It is further conceivable that as the worst case, if a site to which a load is applied continuously and repeatedly, for example, a vane spring 120, is corroded, the surface texture is roughened and the fatigue resistance is thereby lowered. Accordingly, if the margin for strength is made large at the time of designing the vane spring 120 taking the lowering of the fatigue resistance due to corrosion into consideration, it is of course effective to prevent the progress of cracking from the formation of roughened surface texture (fine cracking) formed by corrosion to breakage. Further, if a SUS material having a corrosion resistance is used for the vane spring 120 material, no roughening of the surface texture will be caused on the surface of the vane spring 120 and the reliability of the refrigerant compressor and refrigeration cycle can further be improved.

In this Embodiment, the SUS material is used for the vane spring 120 material. However, the following surface treatment may be applied. Namely, the same effects as the above can be obtained by electroplating (Zn plating or the like) for improvement of corrosion resistance. Further, if the surface layer is hardened to increase the fatigue resistance by a method such as machining, for example, shot peening or surface polishing, or nitrogen treatment, the reliability of the spring material can be improved and the reliability of the refrigerant compressor and refrigeration cycle can thereby be improved.

In the refrigerant compressor 101 according to this Embodiment, a hermetically sealed terminal 113 is disposed at the upper portion of the closed container 102. Accordingly, there is extremely low risk such that the terminal is immersed in the refrigerator oil 108 having the refrigerant dissolved therein or exposed to the liquid refrigerant, whereby the insulation property between terminals can appropriately be maintained.

As described in Embodiments 6 and 7, according to the present invention, it is possible to provide a highly reliable refrigerant compressor employing a new refrigerator oil and a highly reliable refrigeration cycle using it by which the problems of the refrigerator oils used for the refrigerant compressor and refrigeration cycle useful for alternative refrigerants conventionally studied can be solved, by analysis and researches on manufacturing steps, installation work and practical use on market of the refrigerant compressor and refrigeration cycle.

Further, it is possible to provide an improved bearing or spring material by which a highly reliable refrigeration cycle can be provided, even in the case where a high-pressure type compressor is used in a refrigerant compressor wherein the refrigerator oil is subjected to severe operational circumstance or the case where a long existent pipeline containing a large amount of contamination substances is used.

Further, it is possible to provide a hermetically sealed terminal having an improved electrical insulation property, effective for improving the reliability of the electrically driving element which is placed in circumstances such that it is immersed in a refrigerator oil having the refrigerant dissolved therein or sprayed with the oil in a mist state when the compressor is at work, and exposed to a liquid refrigerant stored in the refrigerant compressor when the compressor is stopped.

Further, it is possible to provide as an organic material for an electrical insulation film or an insulating coating material for a wiring used for the refrigerant compressor, ones having a reliability for a long period of time suitable for the aromatic polyether oil having the base oil structure of the present invention.

Further, the refrigeration cycle of the present invention employs as the refrigerator oil the aromatic polyether oil having the base oil structure of the present invention, which is excellent in the lubricity, thermal stability, chemical stability and compatibility with the refrigerant for the refrigerant compressor, and has a bearing material, a spring material, a method for insulating a hermetically sealed terminal and an organic material which are optimum with respect to the combination of the refrigerant containing no chlorine and having a high polarity and the refrigerator oil. Accordingly, it is possible to provide a refrigeration cycle extremely highly reliable even in the case where water content or contamination by production are incorporated, the case where a high-pressure shell type refrigerant compressor for which severe lubrication conditions are required, is used, the case where the pipeline for the refrigerant is long and existent pipelines are utilized, etc.

The first aspect of the present invention is effective to provide a refrigerant-circulating system extremely highly reliable even if a worst case where a large amount of water is incorporated is assumed.

According to the second aspect of the present invention, the aromatic polyether oil has a base oil structure of the formula (1), and is thereby excellent in the compatibility with the hydrofluorocarbon having a high polarity and, even if it flows out of the refrigerant compressor along with the discharged refrigerant, the oil readily circulates within the refrigeration cycle in a state such that it is dissolved in the refrigerant, whereby the performance and reliability of the compressor and refrigeration cycle can be remarkably improved.

The refrigerant-circulating system according to the third aspect of the present invention is effective to provide a refrigerator oil having a higher volume resistivity and being excellent in the insulation properties by adjusting the viscosity.

The fourth aspect of the present invention is effective to obtain a refrigerator oil appropriate in view of the operation coefficiency and reliability of a compressor or a refrigeration cycle for freezing or refrigeration.

The fifth aspect of the present invention is effective to obtain a refrigerator oil appropriate in view of the performance efficiency and reliability of a compressor and a refrigeration cycle for air-conditioning or dehumidification.

The sixth aspect of the present invention is effective to provide a refrigerant-circulating system extremely highly reliable even in a refrigeration cycle of which the ozone depletion coefficient (OPP) is zero which is problematic in the production of global environment.

The seventh aspect of the present invention is effective to provide a refrigerant-circulating system extremely highly reliable even in a refrigeration cycle of which the ozone depletion coefficiency (OPP) is zero and the global working coefficient (GWP) is zero which are problematic for the production of global environment.

The eighth aspect of the present invention is effective to obtain an extremely excellent reliability even if water content is incorporated as compared with conventional refrigerator oil suitable for alternative refrigerants.

The ninth aspect of the present invention is effective to provide a highly reliable apparatus in which additives are not depleted until the life end for the necessary life time in the refrigerant-circulating system on market.

The tenth aspect of the present invention is effective to obtain an extremely excellent reliability even if water content is incorporated as compared with conventional refrigerator oil useful for alternative refrigerants.

The eleventh aspect of the present invention is effective to substantially improve the reliability of apparatuses, since excellent properties can be possessed even if a slight amount of chlorine is incorporated as compared with conventional refrigerator oil useful for a refrigerant containing no chlorine.

According to the twelfth aspect of the present invention, even if an alternative refrigerant containing no chlorine and having a high polarity is employed as a refrigerant, the refrigerator oil shows good compatibility with the refrigerant and can be returned to the compressor even if it is discharged to the refrigeration cycle along with the refrigerant, no failure of lubrication is caused at sliding portions due to the shortage of the refrigerator oil, the refrigerator oil itself is good in the lubrication property and does not require the addition of additives for improvement of lubricity, whereby good sliding properties can be obtained. Further, the refrigerator oil does not undergo hydrolysis in the presence of water content, and is stable and hardly deteriorated. Accordingly, it is possible to obtain a refrigerant compressor having a high reliability and high properties.

According to the thirteenth aspect of the present invention, in addition to the effects of the twelfth aspect, it is possible to obtain a bearing having a high seizure resistance against the combination of a refrigerant containing no chlorine and having a high polarity and the aromatic polyether oil having the base oil structure of the preset invention, whereby a refrigerant compressor having a high reliability and high properties can be obtained.

According to the fourteenth aspect of the present invention, in addition to the effects of the twelfth aspect, it is possible to prevent the corrosion of a spring due to water content even if an aromatic polyether oil having the base oil structure of the present invention of which the saturated water content is relatively high, whereby a refrigerant compressor having a high reliability and high properties can be obtained.

According to the fifteenth aspect of the present invention, in addition to the effects of the twelfth aspect, it is possible to obtain a hermetically sealed terminal which is highly corrosion resistant against the combination of a refrigerant containing no chlorine and having a high polarity and the aromatic polyether oil having the base oil structure of the present invention, and even if an aromatic polyether having the base oil structure of which the volume resistivity is lower than that of a mineral oil or the like, the insulation property of the hermetically sealed terminal can securely be obtained, whereby a refrigerant compressor having a high reliability and high properties can be obtained.

According to the sixteenth aspect of the present invention, in addition to the effects of the twelfth aspect, deterioration of a sealing material such as swelling is hardly caused against the combination of a refrigerant containing no chlorine and having a high polarity and the aromatic polyether oil having the base oil structure of the present invention, whereby a refrigerant compressor having a high reliability and high properties can be obtained.

According to the seventeenth aspect of the present invention, in addition to the effects of the twelfth aspect, the wiring of the stator of the motor is corrosion resistance against the combination of a refrigerant containing no chlorine and having a high polarity and the aromatic polyether oil, and even if an aromatic polyether having the base oil structure of the present invention of which the volume resistivity is lower than that of a mineral oil or the like is employed as a refrigerator oil, the insulation property of the wiring can securely be obtained, whereby a refrigerant compressor having a high reliability and high properties can be obtained.

According to the eighteenth aspect of the present invention, in addition to the effects of the twelfth aspect, the wiring and the core of the stator of the motor are corrosion resistant against the combination of a refrigerant containing no chlorine and having a high polarity and the aromatic polyether oil having the base oil structure of the present invention, and even if an aromatic polyether of which the volume resistivity is lower than that of a mineral oil or the like is used as the refrigerator oil, the insulation property between the wiring and the core portion can securely be obtained, whereby a refrigerant compressor having a high reliability and high properties can be obtained.

According to the nineteenth aspect of the present invention, the refrigerant compressor is highly reliable and has high properties against the combination of the refrigerants as used having a high polarity and the aromatic polyether oil having the base oil structure of the present invention, and it is possible to obtain a highly reliable refrigeration cycle having this refrigerant compressor.

What is claimed is:

1. A refrigerant-circulating system which comprises a refrigeration cycle comprising a refrigerant compressor, a condenser, an expansion mechanism and an evaporator to form a refrigerant circuit and employing a refrigerant which contains no chlorine, wherein an aromatic polyether oil having as a base oil structure a benzene ring having an ether bond is employed as a refrigerator oil.

2. The refrigerant-circulating system according to claim 1, wherein the base oil structure of the aromatic polyether oil is represented by the following formula (1)

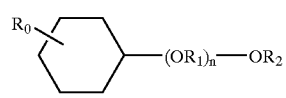

(1)

wherein

is a benzene ring, each of $R_0$, $R_1$ and $R_2$ is an alkyl group having a carbon number of from 0 to 7, the number of $R_0$ is from 1 to 3 and $R_0$ may be attached to any one of five sites of the benzene ring, O is an oxygen atom, and n is a polymerization degree and is an integer of from 1 to 48.

3. The refrigerant-circulating system according to claim 1, wherein the refrigerator oil is a mixture of the aromatic polyether oil and at least one hydrocarbon oil.

4. The refrigerant-circulating system according to claim 1, wherein the refrigerator oil has a viscosity of from 5 to 50 cSt at 40° C. and is used for freezing or refrigeration in which the refrigeration cycle has an evaporation temperature range of from −45 to 0° C.

5. The refrigerant-circulating system according to claim 1, wherein the refrigerator oil has a viscosity of from 20 to 80 cSt at 40° C. and is used for air conditioning or dehumidification in which the refrigeration cycle has an evaporation temperature range of from −20 to 20° C.

6. The refrigerant-circulating system according to claim 1, wherein the refrigerant is a single refrigerant or a refrigerant mixture of a hydrofluorocarbon containing no chlorine having a critical temperature of at least 40° C. and contains at least one selected from the group consisting of R134a, R32 and R125.

7. The refrigerant-circulating system according to claim 1, wherein the refrigerant is a fluorine-containing hetero compound which has a critical temperature of at least 40° C. and contains no chlorine.

8. The refrigerant-circulating system according to claim 1, wherein a drying agent is disposed in the refrigerant circuit for removal of water.

9. The refrigerant-circulating system according to claim 1, wherein the refrigerator oil contains at least one selected from the group consisting of an extreme-pressure additive, an oiliness improver, an antioxidant, an acid remover, a defoaming agent and a metal deactivator.

10. The refrigerant-circulating system according to claim 1, wherein a drying agent is disposed in the refrigerant circuit for removal of water and the drying agent contains no activated alumina as a main component.

11. A method for retrofitting a refrigerant-circulating system which comprises a refrigerant cycle comprising a refrigerant compressor, a condenser, an expansion mechanism and an evaporator to form a refrigerant circuit, and employs a refrigerant containing chlorine contained in the system and a refrigerator oil contained in the refrigerant compressor, characterized in that the refrigerant containing chlorine is discharged from the refrigerant-circulating system; a refrigerant containing no chlorine is charged thereinto; and the refrigerator oil contained in the refrigerant compressor is replaced with an aromatic polyether oil having as a base oil structure a benzene ring having an ether bond or its oil mixture.

12. A refrigerant compressor employing a refrigerant containing no chlorine, which comprises an electrically driving element and a compressing element which compresses the refrigerant by rotating a main shaft by means of the electrically driving element, wherein an aromatic polyether oil having as a base oil structure a benzene ring having an ether bond is employed as a refrigerator oil.

13. The refrigerant compressor according to claim 12, wherein an impregnated bronze material or a carbon material is used as a bearing material of a bearing portion which supports the main shaft.

14. The refrigerant compressor according to claim 12, wherein a spring made of a SUS material or a spring subjected to corrosion resistant surface treatment is used.

15. The refrigerant compressor according to claim 12, wherein a hermetically sealed terminal which is covered and sealed with at least one selected from the group consisting of polyethylene terephthalate, polyphenylene sulfide, polybutylene terephthalate, a nylon resin, polyethylene naphthalate, a polyimide resin, a polyamideimide resin, polyethersulfone, polyetherether ketone, polysulfone, a fluorine resin and silicone, is disposed.

16. The refrigerant compressor according to claim 12, wherein a non-polar rubber or a hydrogenated nitrile rubber is used as a sealing material.

17. The refrigerant compressor according to claim 12, wherein at least one selected from the group consisting of polyester/polyamide, polyesterimide, polyester/polyamideimide, polyesterimide/polyamideimide, polyamideimide and polyimide, is used as an insulating coating material for a winding of a stator of the electrically driving element.

18. The refrigerant compressor according to claim 12, wherein at least one selected from the group consisting of polyethylene terephthalate, polybutylene terephthalate, polyphenylene sulfide, polyethylene naphthalate, a fluorine resin, polyamideimide and polyimide, is disposed at the inner wall of a winding hole of a core portion of a stator of the electrically driving element, as an electrical insulating film material for electrical insulation from a winding.

19. A refrigeration cycle which comprises a refrigerant compressor, a condenser, an expansion mechanism and an evaporator, wherein at least one selected from the group consisting of carbon dioxide, ammonia, hydrofluorocarbon and a fluorine-containing hetero compound, is employed as a refrigerant, and the refrigerant compressor as defined in claim 12 is used.

* * * * *